US010203264B2

(12) United States Patent
Preston et al.

(10) Patent No.: US 10,203,264 B2
(45) Date of Patent: Feb. 12, 2019

(54) NOISE MANAGEMENT FOR OPTICAL TIME DELAY INTERFEROMETRY

(71) Applicant: Adelos, Inc., Polson, MT (US)

(72) Inventors: Dan Alan Preston, Bainbridge Island, WA (US); Stephen Timothy Doll, Big Arm, MT (US); James Alexander Philp, Missoula, MT (US); Trinitie Marie Vance, Bainbridge Island, WA (US)

(73) Assignee: ADELOS, INC., Polson, MT (US)

( * ) Notice: Subject to any disclaimer, the term of this patent is extended or adjusted under 35 U.S.C. 154(b) by 135 days.

(21) Appl. No.: 14/837,592

(22) Filed: Aug. 27, 2015

(65) Prior Publication Data

US 2016/0187223 A1 Jun. 30, 2016
US 2017/0284895 A9 Oct. 5, 2017

Related U.S. Application Data

(60) Provisional application No. 62/042,994, filed on Aug. 28, 2014, provisional application No. 62/042,997, (Continued)

(51) Int. Cl.
*G01B 9/02* (2006.01)
*G01H 9/00* (2006.01)
(Continued)

(52) U.S. Cl.
CPC ......... *G01M 11/319* (2013.01); *G01B 9/0209* (2013.01); *G01B 11/161* (2013.01);
(Continued)

(58) Field of Classification Search
CPC .......................................... G01H 9/004–9/006
See application file for complete search history.

(56) References Cited

U.S. PATENT DOCUMENTS 4,238,856 A * 12/1980 Bucaro ................. G01H 9/004
348/163
4,898,443 A * 2/1990 Epworth ............... H04B 10/60
385/27

(Continued)

FOREIGN PATENT DOCUMENTS

CN         201829006 U     5/2011
WO         WO1997046870    12/1997

OTHER PUBLICATIONS

PCT Search Report and Written Opinion dated Nov. 23, 2015 for PCT Application No. PCT/US15/46966, 10 pages.
(Continued)

*Primary Examiner* — Shawn Decenzo
(74) *Attorney, Agent, or Firm* — Fogg & Powers LLC

(57) ABSTRACT

An integrated fiber interferometry interrogator for generating superimposed waves is disclosed. The system is optimized for efficiency and vibration attenuation. The system comprises an optical light source for generating a first signal, a first signal splitter which splits the first signal into a reference signal and an interrogation signal, optical modulators for modulating the signals, a fiber coupler connected to a fiber under test, an isolator, a circulator with a plurality of connections for directing the signals, a signal mixer for mixing the signals into superimposed waves, and photo diodes for receiving the superimposed waves.

21 Claims, 36 Drawing Sheets

Related U.S. Application Data filed on Aug. 28, 2014, provisional application No. 62/042,999, filed on Aug. 28, 2014, provisional application No. 62/043,002, filed on Aug. 28, 2014, provisional application No. 62/043,004, filed on Aug. 28, 2014, provisional application No. 62/043,007, filed on Aug. 28, 2014, provisional application No. 62/043,009, filed on Aug. 28, 2014, provisional application No. 62/043,015, filed on Aug. 8, 2014, provisional application No. 62/043,017, filed on Aug. 28, 2014, provisional application No. 62/043,023, filed on Aug. 28, 2014, provisional application No. 62/043,026, filed on Aug. 28, 2014, provisional application No. 62/043,029, filed on Aug. 28, 2014, provisional application No. 62/043,031, filed on Aug. 28, 2014, provisional application No. 62/043,034, filed on Aug. 28, 2014, provisional application No. 62/042,896, filed on Aug. 28, 2014, provisional application No. 62/199,098, filed on Jul. 30, 2015, provisional application No. 62/042,989, filed on Aug. 28, 2014.

(51) Int. Cl.
G01L 1/24 (2006.01)
G01B 11/16 (2006.01)
G01D 5/353 (2006.01)
G01M 11/00 (2006.01)
H04B 10/077 (2013.01)
H04B 10/2575 (2013.01)

(52) U.S. Cl.
CPC ......... G01D 5/35319 (2013.01); G01H 9/004 (2013.01); G01L 1/242 (2013.01); G01M 11/3145 (2013.01); H04B 10/0775 (2013.01); H04B 10/2575 (2013.01)

(56) References Cited

U.S. PATENT DOCUMENTS

| | | | |
|---|---|---|---|
| 4,968,880 A | 11/1990 | Beller | |
| 5,115,332 A | 5/1992 | Naito et al. | |
| 5,146,359 A | 9/1992 | Okoshi et al. | |
| 5,371,588 A * | 12/1994 | Davis | G01B 11/24 356/489 |
| 5,694,408 A | 12/1997 | Bott et al. | |
| 5,844,235 A | 12/1998 | Tachikawa et al. | |
| 5,847,816 A | 12/1998 | Zediker et al. | |
| 5,847,817 A | 12/1998 | Zediker et al. | |
| 5,956,355 A | 9/1999 | Swanson et al. | |
| 6,008,487 A | 12/1999 | Tachikawa et al. | |
| 6,043,921 A | 3/2000 | Payton | |
| 6,236,652 B1 | 5/2001 | Preston et al. | |
| 6,285,806 B1 | 9/2001 | Kersey et al. | |
| 7,030,971 B1 | 4/2006 | Payton | |
| 7,142,736 B2 | 11/2006 | Patel et al. | |
| 7,268,863 B2 | 9/2007 | Payton | |
| 7,271,884 B2 | 9/2007 | Payton | |
| 7,274,441 B2 | 9/2007 | Payton | |
| 7,339,721 B1 | 3/2008 | Berkey et al. | |
| 7,355,163 B2 | 4/2008 | Watley et al. | |
| 7,565,334 B2 | 7/2009 | Rifkin et al. | |
| 7,646,944 B2 | 1/2010 | Kaplan | |
| 8,045,143 B2 | 10/2011 | Harres | |
| 8,408,064 B2 | 4/2013 | Hartog et al. | |
| 8,417,490 B1 | 4/2013 | Preston et al. | |
| 8,514,381 B2 | 8/2013 | Shao et al. | |
| 8,587,479 B2 | 11/2013 | Kurokawa | |
| 9,008,506 B2 | 4/2015 | Hsiao et al. | |
| 2001/0050768 A1 | 12/2001 | Uchiyama et al. | |
| 2002/0154291 A1 | 10/2002 | Uchiyama et al. | |
| 2004/0114939 A1 | 6/2004 | Taylor | |
| 2005/0174563 A1 | 8/2005 | Evans et al. | |
| 2005/0254038 A1 | 11/2005 | Harres | |
| 2006/0018586 A1 | 1/2006 | Kishida | |
| 2006/0126991 A1 * | 6/2006 | Huang | B82Y 20/00 385/12 |
| 2006/0227315 A1 | 10/2006 | Beller | |
| 2006/0232765 A1 | 10/2006 | Harres | |
| 2007/0018635 A1 | 1/2007 | Nebendahl | |
| 2007/0113649 A1 | 5/2007 | Bharti et al. | |
| 2007/0171400 A1 * | 7/2007 | Payton | G01M 11/3172 356/73.1 |
| 2007/0194796 A1 | 8/2007 | Harrison et al. | |
| 2008/0036597 A1 | 2/2008 | Harman | |
| 2008/0145049 A1 * | 6/2008 | Koyamada | G01M 11/319 398/28 |
| 2009/0006840 A1 | 1/2009 | Birger et al. | |
| 2009/0173494 A1 | 7/2009 | Tarvin et al. | |
| 2009/0222541 A1 | 9/2009 | Monga et al. | |
| 2010/0002226 A1 | 1/2010 | Hartog | |
| 2010/0098438 A1 | 4/2010 | Prat Goma et al. | |
| 2010/0238429 A1 * | 9/2010 | Hayward | H04B 10/071 356/73.1 |
| 2010/0284021 A1 * | 11/2010 | Hacker | A61B 3/102 356/497 |
| 2010/0290035 A1 | 11/2010 | Wang et al. | |
| 2012/0067118 A1 | 3/2012 | Hartog et al. | |
| 2013/0229649 A1 * | 9/2013 | Li | G01M 5/0091 356/73.1 |
| 2014/0130601 A1 * | 5/2014 | Zhou | G01S 7/521 73/655 |
| 2014/0208855 A1 | 7/2014 | Skinner | |
| 2014/0255023 A1 | 9/2014 | Kishida et al. | |
| 2014/0268110 A1 | 9/2014 | Hartog | |
| 2016/0124407 A1 | 5/2016 | Kallio et al. | |
| 2016/0252414 A1 | 9/2016 | Preston et al. | |

OTHER PUBLICATIONS

PCT Search Report and Written Opinion dated Nov. 30, 2015 for PCT Application No. PCT/US15/46973, 8 pages.
Office action for U.S. Appl. No. 15/154,161, dated Sep. 23, 2016, Preston et al., "A System and Method for Dynamic Event Based IP Addressing", 8 pages.
Adelos 1.1 FPGA Architecture Rev 0.6 (43 pages) by John Providenza dated Oct. 30, 2009.
Adelos 2.0 FPGA Architecture; Providenza & Boekelheide, Inc; Aug. 6, 2013; v0.1.
Adelos 2.0/sw/Panel/Tuner2Dialog.cpp (6 pages).
"Adelos Audio Server Design Document" (3 pages) by Providenza & Boekelheide, Inc. dated Jun. 24, 2010.
"Adelos Report Software" (18 pages) by Tim Roberts dated Mar. 7, 2010.
"Adelos S4 Operations Training v1" (109 pages) PowerPoint presentation. Presented by TerraEchos and GCS Research dated Aug. 2011.
"Adelos S4 Training Guide" (81 pages) by GCS Research dated Aug. 2011.
Adelos S4 Training Guide.Ph.2 (v1) (77 pages) by Earonoff dated Aug. 3, 2011.
"Adelos Sensor System" (16 pages) by Providenza & Boekelheide, Inc. dated Nov. 19, 2013.
Adelos Software Coding Complete (82 pages).
"Adelos Software Coding Complete" (632 pages).
Apids OTR—Telemetry Doc. No. 64236 / DDL—Apr. 1968, (17 pages) dated Apr. 19, 2005.
Apids OTR—Telemetry Doc. No. 64236 / DDL—Apr. 1968, (17 pages) dated Jun. 21, 2004.
Data Grabber Thread, 1 of 2, "Data Grabber Thread, 2 of 2", and "FFT Routine" (3 pages total) by Tim Roberts dated Jan. 29, 2009.
"Fiber Couplers" RP Photonics Encyclopedia. http://www.rp-photonics.com/fiber_couplers.html. 3 pages.
Fiber Optic Distrbuted Sensing Version 3.X.
"Frequency Modulation," Fiber Optics.info. http://www.fiber-optics.info/articles/frequency_modulation_fm. 2 pages.

(56) References Cited

OTHER PUBLICATIONS

Providenza et al., "Flexible Fiber Sensing Using Virtual Correlation Cells," dated Dec. 14, 2009, 14 pages.
Roweis et al., "A Unifying Review of Linear Gaussian Models," 1999. Neural Computation vol. 11, pp. 305-345.
"Telemetry Board Opcodes Version 1" (25 pages) by Dr. Robert M. Payton dated Oct. 9, 2004.
Adelos Software Coding Complete (438 pages).

\* cited by examiner

NOISE MANAGEMENT FOR OPTICAL TIME DELAY INTERFEROMETRY

CROSS REFERENCE TO RELATED PATENT APPLICATIONS

This application claims priority to U.S. Provisional Patent Application No. 62/042,989 filed on Aug. 28, 2014, entitled "System and Method for Electro Optical Modulation", U.S. Provisional Patent Application No. 62/042,994 filed on Aug. 28, 2014, entitled "System and Method for Acousto-Optical Modulation", U.S. Provisional Patent Application No. 62/042,997 filed on Aug. 28, 2014, entitled "System and Method for Fidelity up to 24,000 HZ", U.S. Provisional Patent Application No. 62/042,999 filed on Aug. 28, 2014, entitled "Fiber-Optic Based Sensing System and Methods Using Virtual Correlation Cells", U.S. Provisional Patent Application No. 62/043,002 filed on Aug. 28, 2014, entitled "System and Method for the Control Panel", U.S. Provisional Patent Application No. 62/043,004 filed on Aug. 28, 2014, entitled "System and Method for the Hardware Control Panel and Diagnostics", U.S. Provisional Patent Application No. 62/043,007 filed on Aug. 28, 2014, entitled "System and Method for Detection Logic", U.S. Provisional Patent Application No. 62/043,009 filed on Aug. 28, 2014, entitled "System and Method for Telemetry Recording and Display", U.S. Provisional Patent Application No. 62/043,015 filed on Aug. 28, 2014, entitled "System and Method for Audio Extension to Wave Convertor", U.S. Provisional Patent Application No. 62/043,017 filed on Aug. 28, 2014, entitled "System and Method for Filtering High Low Band Pass", U.S. Provisional Patent Application No. 62/043,23 filed on Aug. 28, 2014, entitled "System and Method for the Waterfall Display", U.S. Provisional Patent Application No. 62/043,026 filed on Aug. 28, 2014, entitled "System and Method for Dynamic Characterization of Fiber Optic Sensor Array", U.S. Provisional Patent Application No. 62/043,029 filed on Aug. 28, 2014, entitled "System and Method for Improved in Situ Measurements Using Fiber Optic Sensor Array", U.S. Provisional Patent Application No. 62/043,031 filed on Aug. 28, 2014, entitled "System and Method for Enhanced Event Identification and Tracking Using Fiber Optic Sensor Array", U.S. Provisional Patent Application No. 62/043,034 filed on Aug. 28, 2014, entitled "System and Method for Improved Identification, Classification, and Prediction of Micro-Seismic and Audible Events Using a Fiber Optic Sensor Array", U.S. Provisional Patent Application No. 62/042,896 filed on Aug. 28, 2014, entitled "System and Method for Demodulating Rayleigh Backscattered Signals", and U.S. Provisional Patent Application No. 62/199,098 filed on Jul. 30, 2014, entitled "System and Method for Fiber Optic Sensing", which applications are hereby incorporated in their entirety by reference.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD OF THE INVENTION

The present invention relates to fiber optic sensing, and in particular to distributed acoustic sensing (DAS). More specifically, it relates to a system and methods that comprise an integrated fiber optic interrogator and an embedded controller.

BACKGROUND

Fiber optic sensors are increasingly being used as devices for sensing quantities such as temperature, mechanical strain, displacements, vibrations, pressure, acceleration, rotations, or chemical concentrations. In fiber optic sensors, light is sent through an optical fiber and the returning backscattered light is analyzed. Changes in the parameters of the returning light, as compared to the input light signal baseline, may be measured and tracked.

By phase differencing the reflected signal with a reference signal, minute changes can be detected; these relate directly to the event that is causing the laser signals to be reflected. As one example, acoustic pressure waves in the vicinity of a fiber cable will impart micro strains on the fiber. These micro strains are proportional to the acoustic pressure waves, essentially imparting the frequency of the acoustic pressure wave into the back reflected signal; this is generally referred to a modulating a signal. Phase differencing the reflected signal allows the signal to be demodulated and the acoustic pressure wave reconstructed. This technology essentially turns a fiber optic cable into a microphone.

A growing usage application field for this technology is a fiber sensing system for remote downhole monitoring of oil wells. Other application fields include physical security, such as homeland security and border monitoring. The list of existing and potential applications for this new technology is long and continues to grow. Managing noise associated with the fiber has proven difficult. For example, reduction of acoustic signals impinging on the system hardware that contribute to what is termed signal noise floor has been difficult.

SUMMARY OF THE INVENTION

Although the best understanding of the present invention will be had from a through reading of the specification and claims presented below, this summary is provided in order to acquaint the reader with some of the new and useful features of the present invention. Of course, this summary is not intended to be a complete litany of all of the features of the present invention, nor is it intended in any way to limit the breadth of the claims, which are presented at the end of the detailed description of this application.

The following detailed description is directed to technologies for noise management for optical time delay interferometry. In some examples, distributed fiber optic sensing is used to mitigate acoustic noise and noise floor in an effort to increase the utility and/or flexibility of the sensing systems.

According to some examples, a distributed fiber optic sensing system with increased flexibility and/or utility is described.

In some configurations, a time-domain reflectometer is described wherein an optical fiber span is the object of the reflectometry, and provides output signals representative of acoustic pressure waves incident the span.

Example configurations capable of providing acoustic wave signal sensing lengths of up to the total length a coherent signal that can be detected and demodulated in a round trip are also described.

In some examples, acoustic wave signal sensing lengths of up to 40.0 km may be utilized. According to some configurations, a large plurality of sensed events along the span may also be provisioned. In some examples, output signals in the form of a phase signal which varies linearly with the acoustic pressure wave.

Other features of the present invention will be apparent from the accompanying drawings and from the detailed description that follows.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed inventions, it is intended that the inventions not be limited only to the specific structure, material or acts that are described in the examples, but in addition, include any and all structures, materials or acts that perform the claimed function as described in alternative examples or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The examples of the invention are illustrated in the accompanying drawings, in which.

Figure 1:
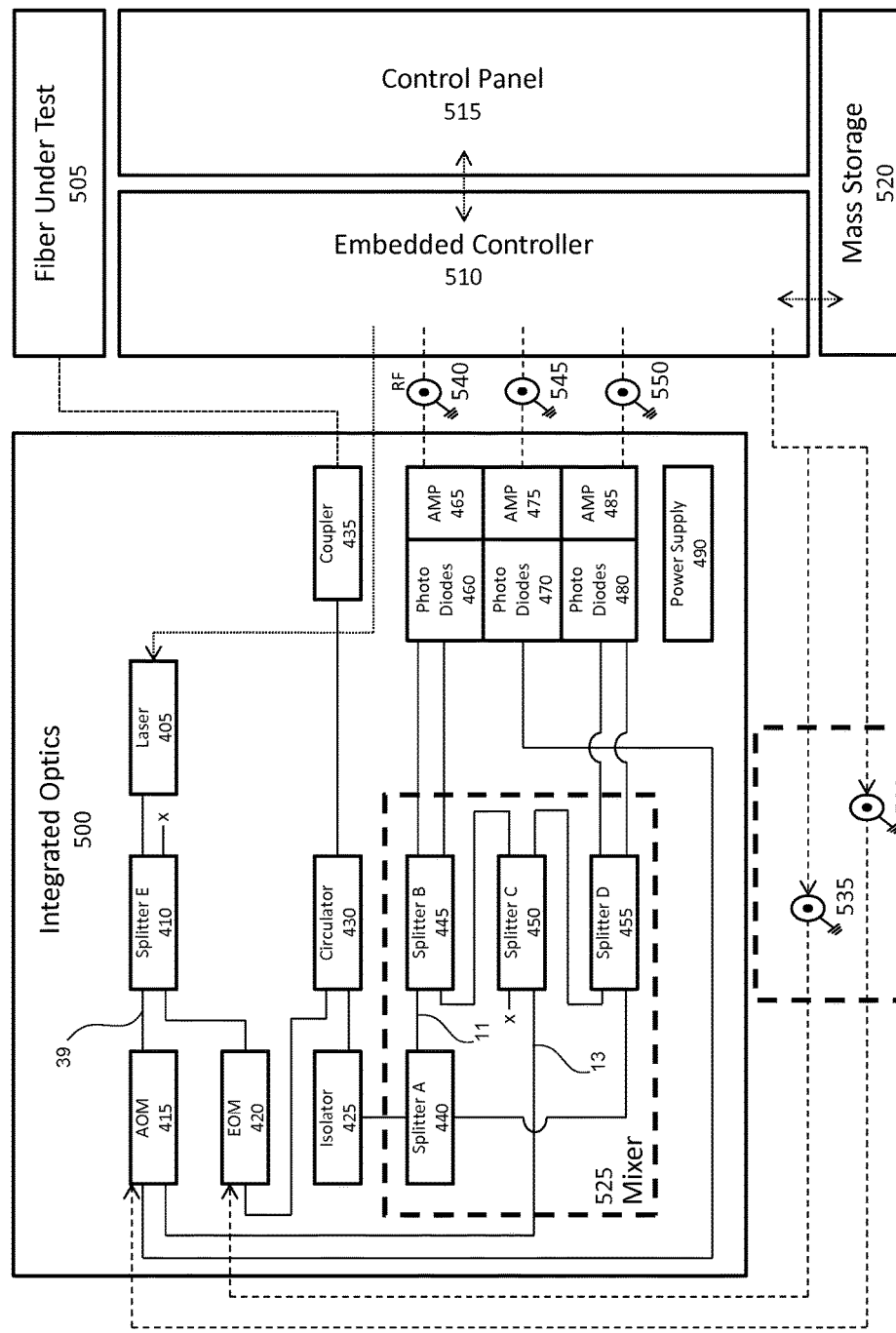
FIG. 1 depicts the base configuration of an integrated fiber optic interrogator and data logger.

Elements and acts in the figures are illustrated for simplicity and have not necessarily been rendered according to any particular sequence or example.

DETAILED DESCRIPTION

In the following description, and for the purposes of explanation, numerous specific details, process durations, and/or specific formula values are set forth in order to provide a thorough understanding of the various aspects of exemplary examples. It will be understood, however, by those skilled in the relevant arts, that the apparatus, systems, and methods herein may be practiced without these specific details, process durations, and/or specific formula values. It is to be understood that other examples may be utilized and structural and functional changes may be made without departing from the scope of the apparatus, systems, and methods herein. In other instances, known structures and devices are shown or discussed more generally in order to avoid obscuring the exemplary examples. In many cases, a description of the operation is sufficient to enable one to implement the various forms, particularly when the operation is to be implemented in software. It should be noted that there are many different and alternative configurations, devices, and technologies to which the disclosed examples may be applied. The full scope of the examples is not limited to the examples that are described below.

In the following examples of the illustrated examples, references are made to the accompanying drawings which form a part hereof, and in which is shown by way of illustration various examples in which the invention may be practiced. It is to be understood that other examples may be utilized and structural and functional changes may be made without departing from the scope of the invention.

So as to reduce the complexity and length of the Detailed Specification, and to establish the state of the art in certain areas of technology, Applicant(s) herein expressly incorporate(s) by reference all of the following materials identified in each numbered paragraph below. The incorporated materials are not necessarily "prior art".

U.S. Provisional Patent Application No. 62/199,098 to Preston, et al, filed Jul. 30, 2015, entitled: System and Method for Fiber Optic Sensing, herein incorporated by reference in its entirety.

"Adelos.3.r.9.6" (29 pages) by Dan Preston dated June 2015, hereby incorporated by reference in its entirety and included as non-patent literature on the submitted information disclosure statement of Aug. 27, 2015 due to minimal publication data of the proprietary document.

"Adelos 1.1 FPGA Architecture Rev 0.6" (43 pages) by John Providenza dated Oct. 30, 2009, hereby incorporated by reference in its entirety and included as non-patent literature on the submitted information disclosure statement of Aug. 27, 2015 due to minimal publication data of the proprietary document.

"Adelos S4 Training Guide.Ph.2 (v1)" (77 pages) by Earonoff dated Aug. 3, 2011, hereby incorporated by reference in its entirety and included as non-patent literature on the submitted information disclosure statement of Aug. 27, 2015 due to minimal publication data of the proprietary document.

"Adelos Firmware Coding Complete" (82 pages), hereby incorporated by reference in its entirety and included as non-patent literature on the submitted information disclosure statement of Aug. 27, 2015 due to minimal publication data of the proprietary document.

"Adelos Hardware Coding Complete" (438 pages), hereby incorporated by reference in its entirety and included as non-patent literature on the submitted information disclosure statement of Aug. 27, 2015 due to minimal publication data of the proprietary document.

"Adelos Report Software" (18 pages) by Tim Roberts dated Mar. 9, 2010, hereby incorporated by reference in its entirety and included as non-patent literature on the submitted information disclosure statement of Aug. 27, 2015 due to minimal publication data of the proprietary document.

"Adelos Sensor System" (16 pages) by Providenza & Boekelheide, Inc. dated Nov. 19, 2013, hereby incorporated by reference in its entirety and included as non-patent literature on the submitted information disclosure statement of Aug. 27, 2015 due to minimal publication data of the proprietary document.

"Adelos Software Coding Complete" (632 pages), hereby incorporated by reference in its entirety and included as non-patent literature on the submitted information disclosure statement of Aug. 27, 2015 due to minimal publication data of the proprietary document.

"Adelos 2.0 FPGA Architecture v0.1" (36 pages) by John Providenza dated Aug. 6, 2013, hereby incorporated by reference in its entirety and included as non-patent literature on the submitted information disclosure statement of Aug. 27, 2015 due to minimal publication data of the proprietary document.

PCT Patent Application No. PCT/US1997/009892 to Bridge et al, filed Jun. 6, 1997, entitled: Retroflectively Reducing Coherence Noise in Reflectometers, herein incorporated by reference in its entirety.

"Fiber Couplers" RP Photonics Encyclopedia. http://www.rp-photonics.com/fiber_couplers.html.3 pages U.S. Pat. No. 6,043,921 to Payton, issued Mar. 28, 2000, entitled: Fading-Free Optical Phase Rate Receiver, herein incorporated by reference in its entirety.

U.S. Pat. No. 7,030,971 to Payton, issued Apr. 18, 2006, entitled: Natural Fiber Span Reflectometer Providing a Virtual Signal Sensing Array Capability, herein incorporated by reference in its entirety.

U.S. Pat. No. 7,268,863 to Payton, issued Sep. 11, 2007, entitled: Natural Fiber Span Reflectometer Providing a Spread Spectrum Virtual Sensing Array Capability, herein incorporated by reference in its entirety.

U.S. Pat. No. 7,271,884 to Payton, issued Sep. 18, 2007, entitled: Natural Fiber Span Reflectometer Providing a Virtual Phase Signal Sensing Array Capability, herein incorporated by reference in its entirety.

U.S. Pat. No. 7,274,441 to Payton, issued Sep. 25, 2007, entitled: Natural Fiber Span Reflectometer Providing a Virtual Differential Signal Sensing Array Capability, herein incorporated by reference in its entirety.

U.S. patent application Ser. No. 10/776,832 to Evans et al, filed Feb. 11, 2004, entitled: Active Fiber Loss Monitor and Method, herein incorporated by reference in its entirety.

U.S. patent application Ser. No. 10/711,918 to Tarvin et al, filed Oct. 13, 2004, entitled: System and Method to Interpret Distributed Temperature Sensor Data and to Determine a Flow Rate in a Well, herein incorporated by reference in its entirety.

U.S. patent application Ser. No. 13/221,280 to Hartog et al, filed Aug. 30, 2011, entitled: Distributed Fiber Optic Sensor System with Improved Linearity, herein incorporated by reference in its entirety.

U.S. patent application Ser. No. 13/751,054 to Skinner, filed Jan. 26, 2013, entitled: Distributed Acoustic Sensing with Multimode Fiber, herein incorporated by reference in its entirety.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Technologies are described herein for a fiber-optic sensor system that detects perturbations or pressure strain variation in a fiber optic cable by measuring changes in reflected laser light. The system is directed at processing telemetry in real-time, recording telemetry data for later playback and analysis, and presenting waterfall displays and audio output for real-time monitoring of threats and situational status. Longer lengths of sensing fiber may be used depending on parameters and sensing methods.

Glossary

There are a number of terms in this document that have unique meanings in the context of this disclosure:

CW—Continuous Wave. A continuous wave is an electromagnetic wave of constant or near constant amplitude and frequency; and in mathematical analysis, of infinite duration.

DAS—Distributed Acoustic Sensing. In DAS, the optical fiber cable becomes the sensing element and measurements are made, and in part processed, using an attached optoelectronic device. Such a system allows acoustic frequency strain signals to be detected over large distances and in harsh environments.

DTS—Distributed Temperature Sensing. DTS are optoelectronic devices which measure temperatures by means of optical fibers functioning as linear sensors. Temperatures are recorded along the optical sensor cable, thus not at points, but as a continuous profile. A high accuracy of temperature determination is achieved over great distances. Typically the DTS systems can locate the temperature to a spatial resolution of 1 m with accuracy to within +1° C. at a resolution of 0.01° C. Measurement distances of greater than 30 km can be monitored and some specialized systems can provide even tighter spatial resolutions.

DTSS—Distributed Temperature and Strain Sensing.

MMF—Multimode Fiber. The primary difference between multimode and single mode optical fiber is that multimode has much larger core diameter, typically 50-100 micrometers; much larger than the wavelength of the light carried in it. Multimode fiber supports more than one propagation mode which limits the fiber by modal dispersion. Due to the modal dispersion, multimode fiber has higher pulse spreading rates than single mode fiber, limiting multimode fiber's information transmission capacity. Single mode fibers are most often used in high-precision sensing applications because the allowance of only one propagation mode of the light makes the light source easier to focus properly.

OTDR—Optical Time-Domain Reflectometer. An optical time-domain reflectometer is an optoelectronic instrument used to characterize an optical fiber. An OTDR is the optical equivalent of an electronic time domain reflectometer. It injects a series of optical pulses into the fiber under test. It also extracts, from the same end of the fiber, light that is scattered (Rayleigh backscatter) or reflected back from points along the fiber. The strength of the return pulses is measured and integrated as a function of time, and plotted as a function of fiber length.

PRC—Pseudo-Random Code. A sequence of reproducible random pulses, produced by a polynomial. A PRC correlates very well with itself, but very poorly when one of the signals being correlated is delayed. The use of a PRC allows one to pick out a particular transmitter when a large number of transmitters are sending the same sequence at different times.

RF—Radio Frequency. Radio frequency is a rate of oscillation in the range of around 3 kHz to 300 GHz, which corresponds to the frequency of radio waves, and the alternating currents which carry radio signals. RF usually refers to electrical rather than mechanical oscillations; however, mechanical RF systems do exist ROS—Rayleigh Optical Scattering. Rayleigh scattering is the (dominantly) elastic scattering of light or other electromagnetic radiation by particles much smaller than the wavelength of the light. The particles may be individual atoms or molecules. Rayleigh scattering results from the electric polarizability of the particles. The oscillating electric field of a light wave acts on the charges within a particle, causing them to move at the same frequency. The particle therefore becomes a small radiating dipole whose radiation can be seen as scattered light.

ROSE—Rayleigh Optical Scattering and Encoding.

Sample—The telemetry readings from one point in time. In some configurations, a sample contains 4,096 16-bit floating point numbers—one for each zone, for each polarization, for each quadrature phase. The Digital Signal Processor (DSP) refers to this as a Telemetry Processing Unit (TPU).

SMF—Single Mode Fiber. SMF is designed to carry light only directly down the fiber—the transverse mode. Modes are the possible solutions of the Helmholtz equation for waves, which is obtained by combining Maxwell's equations and the boundary conditions. These modes define the way the wave travels through space, i.e. how the wave is distributed in space. Waves can have the same mode but have different frequencies. This is the case in single-mode fibers where waves can have the same mode but different frequencies which means that they are distributed in space in the same way, and provide a single ray of light. Although the ray travels parallel to the length of the fiber, it is often called transverse mode since its electromagnetic vibrations occur perpendicular (transverse) to the length of the fiber.

P and S refer to two polarizations of the laser light and are explained further in a later section.

An understanding of three phenomena—two physical (Rayleigh backscattering and fiber stretching), and one mathematical (pseudo-random code) are helpful in understanding the present disclosure.

Rayleigh Backscattering

The laser light source is modulated by injecting a known, repeating pattern. This modulated signal is reflected back to the light origin by Rayleigh backscatter all along the fiber optic cable. Light reflected from a given point will return to the source, with a delay based on the speed of light in the fiber. Assuming the speed of light in the fiber is about 200,000,000 m/s, it will take 100 ns for the signal to travel out 10 meters and reflect back through 10 meters. If the signal is precisely correlated 100 ns after it was transmitted, it will be found within the large number of reflections coming back from the fiber length.

For purposes of explanation, the speed of light in a vacuum is known to be 299,792,458 m/s. Light in a fiber is slowed based on the refractive index of the fiber. At the 1319 nm wavelength produced by the laser, the SMF-28e fiber currently used in some example configurations has a refractive index of 1.4677. That makes the speed of light within the fiber 204,260,038 m/s. For discussion purposes, it will be rounded to 200,000,000 m/s, but in the field it is necessary to remember that this estimate is 2.13% low. When it is said that a zone is 1 meter, the physical reality is that a zone is 1.0213 m. The difference is not important for discussion, but may be important in operation. The analysis software takes this into account when displaying distances.

With the above in mind, Continuous Wave lasers have a distinct advantage over pulsed laser. Pulse modulating a CW laser is not the same as pulsed laser. It is both well understood in the art and to some extent misunderstood. Many inventions in the art of interferometry will falsely label and describe pulse modulated in an effort to traverse certain prior art related to CW. The reality is at long ranges, the best a pulsed laser will achieve is 1 KHz sampling, where CW will allow for much higher rates, e.g. 24 KHz. The following discussion describes the limitations of pulsed laser; all values approximate.

Assume a 50 KM cable length and fiber optics roughly ⅓ slower; what is the maximum sampling rate achievable with a pulsed laser, anticipate round trip delay:

Light travels in a vacuum roughly $0.3 \text{ M}/1(10^{-9})$ Seconds

Assume a 50 KM Cable with a 100 KM round trip

Since fiber is a third slower, $0.3 \text{ M}/1(10^{-9})$ Seconds*0.67=$0.2 \text{M}/1(10^{-9})$ Seconds 1 light pulse will take [100,000/0.2 M/1($10^{-9}$) Seconds] or roughly $5(10^{-4})$ Seconds per pulse Dividing now 1 second/5.0 ($10^{-4}$) Seconds per pulse yields a max frequency of roughly 2 kHz with a Nyquist Frequency of 1 kHz.

Shorter distances obviously yield higher sampling rates

As long as the PRN code is not repeated, and coherent signals can be retrieved, sampling can be performed at much higher hates (fidelity) and much longer distances. Also, a second consideration is spatial resolution which is mainly determined by the duration of the transmitted pulse, with a 100 ns pulse giving 10 m resolution being a typical value. The amount of reflected light is proportional to the pulse length so there is a trade-off between spatial resolution and maximum range. To improve the maximum range, it would be desirable to use a longer pulse length to increase the reflected light level but this leads to a larger spatial resolution. In order for two signals to be independent, they must be obtained from two points on the fiber that is separated by at least the spatial resolution. It is possible to obtain samples at separations less than the spatial resolution and although this produces signals that are not independent of each other, such an approach does offer advantages in some applications. The separation between the sampling points is sometimes referred to as the spatial sampling period.

Fiber optic cables are not perfect. They contain a huge number of very tiny imperfections. Those imperfections reflect a small fraction of the light being transmitted through the cable. This reflected light can be measured back at the cable origin source.

Fiber Stretching

The cable sensitivity of fiber affects disturbances detected. Any disturbance near the cable, for instance, buried in the ground, such as footsteps, vehicles, rock falls, voices, etc., sends a small shockwave or pressure wave through the ground. Those small shockwaves disturb the fiber, causing the fiber to stretch microscopically. Those micro-stretches cause the light signal to be delayed slightly, e.g., a phase shift. This delay changes the success of the attempt to correlate the signal at precise delay points. By measuring the changes in correlation, the frequency of the disturbance that impinged on the cable can be determined. The pressure wave impact on the buried fiber optic cable can be referred to as "coupling effect," the physical mechanism of how pressure is transmitted through a medium like soil against the fiber coating. Enhancing and maximizing the coupling is a key to measuring successfully the change in the arrival and departure of light through micro-strains in the fiber optic cable.

The Rayleigh backscatter reflections are at a very low level. To optimize the correlation opportunities, the modulated signal is read at two different polarizations, labeled S and P. The laser is polarized in one direction, but the fiber randomizes the polarization to a certain degree. When one polarization fades away because of conditions in the fiber, the other polarization will tend to rise.

Pseudo-Random Code

A mathematical phenomenon helps to make it possible to use a standard fiber and a standard continuous wave (CW) laser. In some example configurations, the hardware generates a non-repeating pseudo-random code (PRC) sequence which is modulated onto the laser at a 100 MHz symbol rate. One aspect of the PRC sequence is that it has very important auto-correlation properties. A code will correlate extremely well with itself if it is exactly phase aligned. If it is poorly aligned, it correlates very poorly.

This is the fundamental principle behind the correlators. As an example: at 100 MHz, the PRC units are sent once each 10 ns. In 10 ns, laser light in the fiber travels approximately two meters—one meter out, and one meter back. Thus, a correlation unit can "look for" a time delayed version of the code that represents a specific section of the fiber. By correlating against the PRC sequence delayed by ten cycles, the correlation unit will get its best match to signals from ten meters down the fiber, and will tend to reject all of the other reflections.

The values used in this description serve as an example. It should be understood that other values may be used depending upon the sensing methods, equipment, system requirements, preferences, and other variables within each system. There are many parameters and sensing methods that can be used in different configurations to meet different requirements.

System Operation

The Fiber Optic Interrogator and Data Logger, depicted in FIG. 1 and referred to herein as the base configuration, comprises a highly integrated and optimized fiber optic interrogator package (integrated optics) 500, embedded controller 510, mass storage 520 of raw data and timing reference, large bandwidth Ethernet for data transfer, control panel 515 software with Ethernet link to the embedded controller 510, and fiber under test 505. In an example, all optical components are optimized in a standalone package based on a JDSU continuous wave (CW) laser. The integrated optical system 500 may include a built-in power supply 490. In some examples the integrated optics 500 may be 3D printed.

The embedded controller 510 sends operating control signals to the laser 405. The laser 405 emits light as a continuous wave (CW) or a pulse modulated signal into splitter E 410 which splits the signal into a reference signal and an interrogation signal. The reference signal is modulated by an acousto-optic modulator (AOM) 415 and the interrogation is modulated by an electro-optic modulator (EOM) 420. A portion of the modulated reference signal from the AOM 415 is transmitted to the integrated and optimized mixer subsystem 525 to splitter C 450. The remaining portion of the modulated reference signal from the AOM 415 travels to photo diodes 470 and into amplifier 475. The modulated interrogation signal from the EOM 420 travels into a circulator 430. The circulator 430 transmits the modulated interrogation signal through coupler 435 and out into the fiber under test 505. A modulated signal is backscattered from the fiber under test 505 back through coupler 435 and into the circulator 430. The modulated signal backscattered from the fiber under test 505 travels through the circulator 430, into isolator 425, then into the signal mixer subsystem 525 at splitter A 440. The signal mixer 525 comprises a plurality of signal splitters and or signal combiners. Splitter A 440 splits the signal into combiner B 445 and combiner D 455. The modulated reference signal from the AOM 415 enters splitter C 450 which splits the signal into combiner B 445 and combiner D 455. Combiner B 445 transmits superimposed waves into photo diodes 460 and then into amplifier 465. Combiner D 455 transmits superimposed waves into photo diodes 480 and then into amplifier 485. Amplifiers 465, 475, and 485 amplify the superimposed waves and transmit them into RF links 540, 545, and 550, respectively which convert them to radio signals and transmits the resultant RF signals to the embedded controller 510.

The embedded controller 510 further transmits control information to the AOM 415 and the EOM 420 through RF generators 530 and 535, respectively. Data is transmitted back and forth between the embedded controller 510 and mass storage 520 as well as between the embedded controller 510 and the control panel 515.

In some examples the fiber under test has a coating thereon made of a thermoplastic material having the combined characteristics of a low Young's modulus and a Poisson's ratio below that of natural rubber, wherein the coating enhances the longitudinal component of strain variation derived from an acoustic wave signal. The fiber under test has a length L and the light source is a laser having the capability to generate a signal with sufficient stability to retain coherency in propagation along the fiber under test for a distance at least equal to two times the length L. The fiber under test may be single mode, multimode, or polarization preserving fiber optic cable.

Referring to FIG. 1, the base configuration further comprises a VMEbus 605. The VMEbus 605 is a non-proprietary computer bus standard that facilitates forward and backward compatibility and multi-processing (1-21 processors). The VMEbus uses asynchronous daisy chain, master/slave architecture. The VMEbus, well known in the art, comprises a number of slots into which modular cards can be inserted. Each modular card adds additional functionality to the embedded controller 510.

Figure 2:
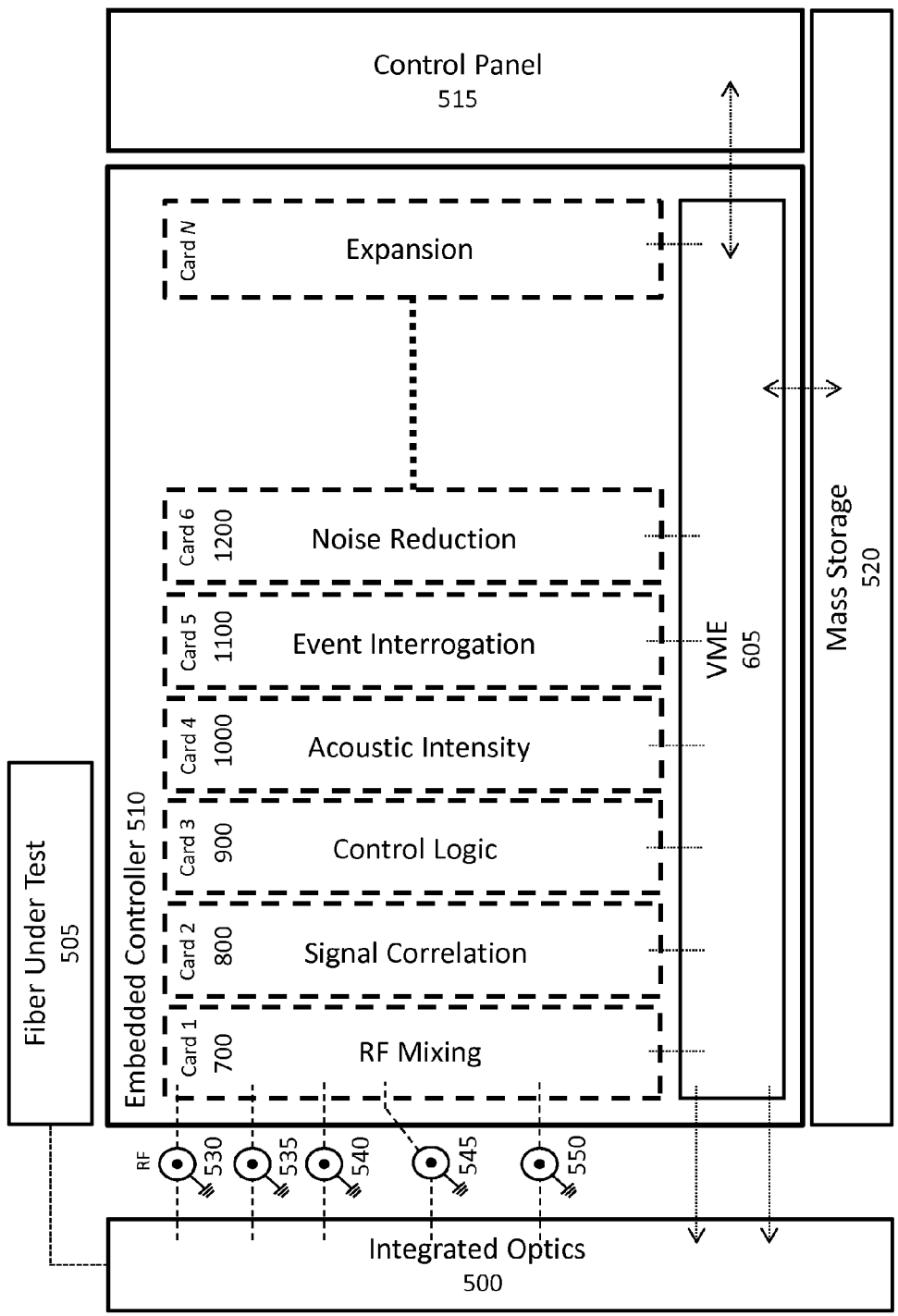
FIG. 2 depicts the base configuration of FIG. 1 equipped with an example assortment of modular cards.

FIG. 2 depicts the base configuration of FIG. 1 equipped with an example assortment of modular cards. The cards shown are radio frequency (RF) mixing 700, signal correlation 800, control logic 900, acoustic intensity 1000, event interrogation 1100, noise reduction 1200, up to card N expansions. In the depicted example the modular cards are numbered 1 to N, however, the purpose of the numbering is merely to aid in the description and does not necessarily reflect priority or order of installation.

Figure 3:
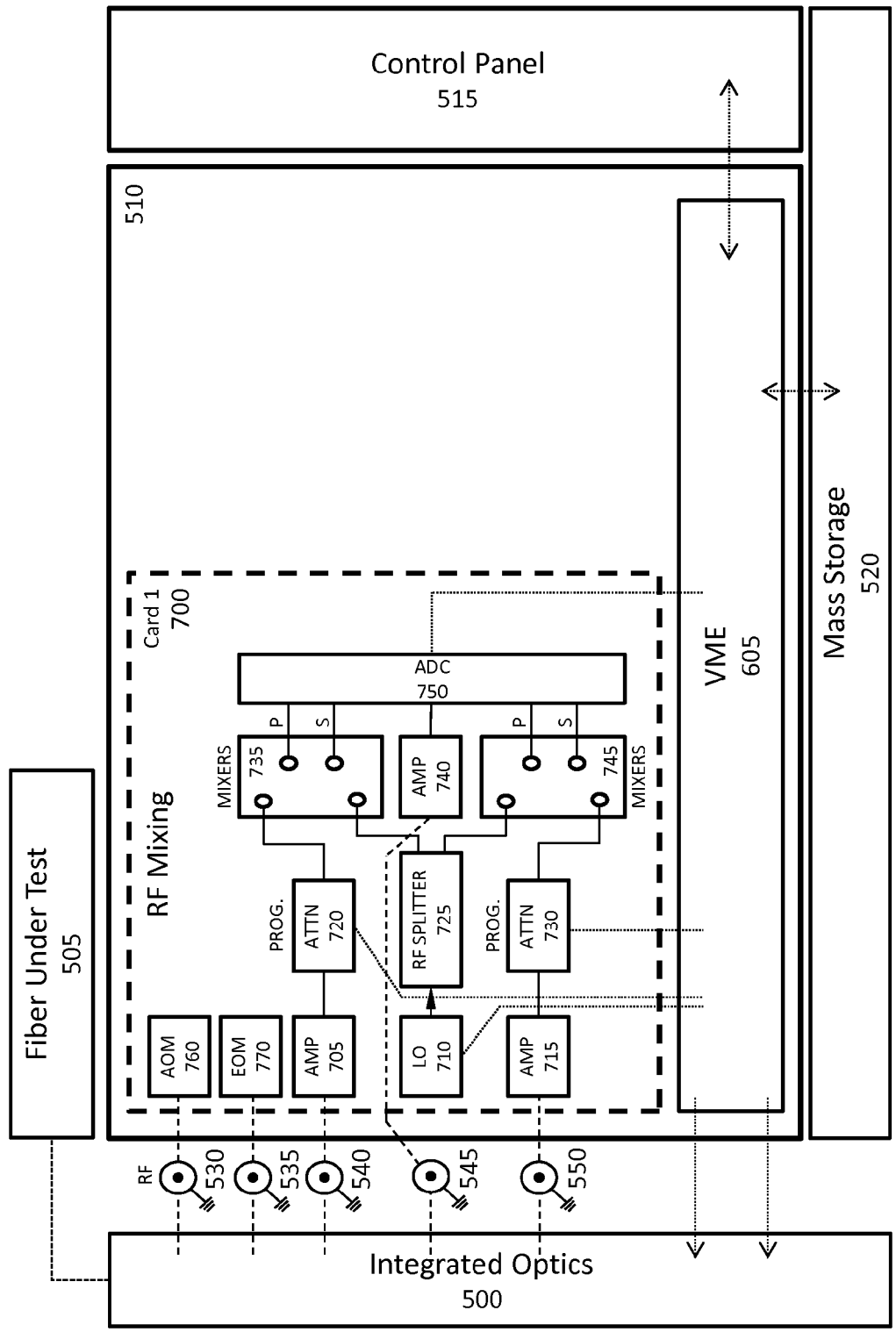
FIG. 3 depicts a first expansion card of FIG. 2—RF Mixing 700 and Analog to Digital Conversion (ADC), referred to herein as Card 1.

FIG. 3 depicts a first expansion card of FIG. 2—RF Mixing 700 and Analog to Digital Conversion (ADC), referred to herein as Card 1. The purpose of Card 1 700 is to retrieve the RF signals from the fiber under test 505 and convert them into digital signals for further processing.

The RF signals enter Card 1 700 from RF links 530, 535, 540, 545, and 550. The RF signals from RF links 530 and 535 transmit data from the AOM RF generator 760 and the EOM RF generator 770, respectively. The RF signal from RF link 545 is the power feedback for laser control. It is amplified through amplifier 740 and passed to ADC 750.

Local oscillator 710 outputs a signal that is split by RF splitter 725 and relayed into mixers 735 and 745. In an example, the local oscillator 710 outputs a 900 MHz signal added to a 10 Hz beat frequency. The RF signal from RF link 540 is amplified by amplifier 705, attenuated by attenuator 720, and relayed to mixer 735 where it is mixed with a portion of the signal from local oscillator 710. The signal from RF link 550 is amplified by amplifier 715 attenuated by attenuator 730 and relayed to mixer 745 where it is mixed with a portion of the signal from local oscillator 710.

The mixers 735 and 745 output P and S signals to the ADC 750. The resulting digital signal is sent from Card 1 700 to VME 605 and further forwarded to mass storage 520 and control panel 515. Further information is passed to the VME 605 from the local oscillator 710 and the attenuators 720 and 730.

Figure 4:
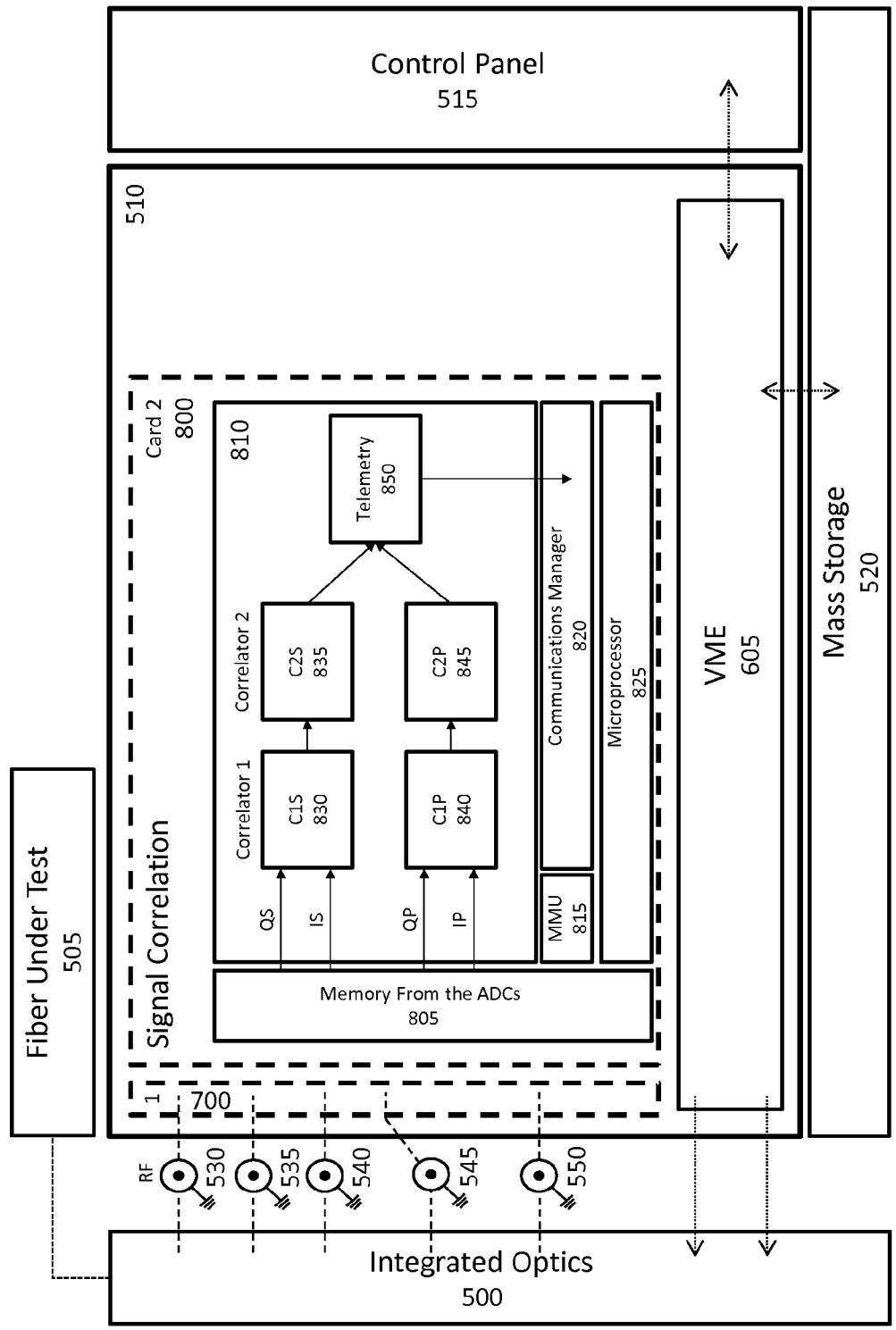
FIG. 4 depicts a second expansion card of FIG. 2—Signal Correlation 800, referred to herein as Card 2.

FIG. 4 depicts a second expansion card of FIG. 2—Signal Correlation 800, referred to herein as Card 2. Card 2 800 uses a digital signal processor (DSP) to take the converted signals from Card 1 700 and correlate them into telemetry information.

To optimize the correlation opportunities, the modulated signal is read at two different polarizations, labeled S and P. The laser is polarized in one direction, but the fiber randomizes the polarization to a certain degree. When one polarization fades away because of conditions in the fiber, the other polarization will tend to rise.

The converted signal data is retrieved from memory 805 and passed into the correlator system 810. The in-phase and quadrature phase S signals (IS and QS) are correlated in a first correlator, C1S, 830 and transmitted to a second correlator, C2S, 835 then to telemetry 850. The in-phase and quadrature phase P signals (IP and QP) are correlated in a first correlator, C1P, 840 and transmitted to a second correlator, C2P, 845 then to telemetry 850. The telemetry information is then transmitted to a communications manager 820. Card 2 800 may also include a microprocessor 825 and a memory management unit (MMU) 815.

Figure 5:
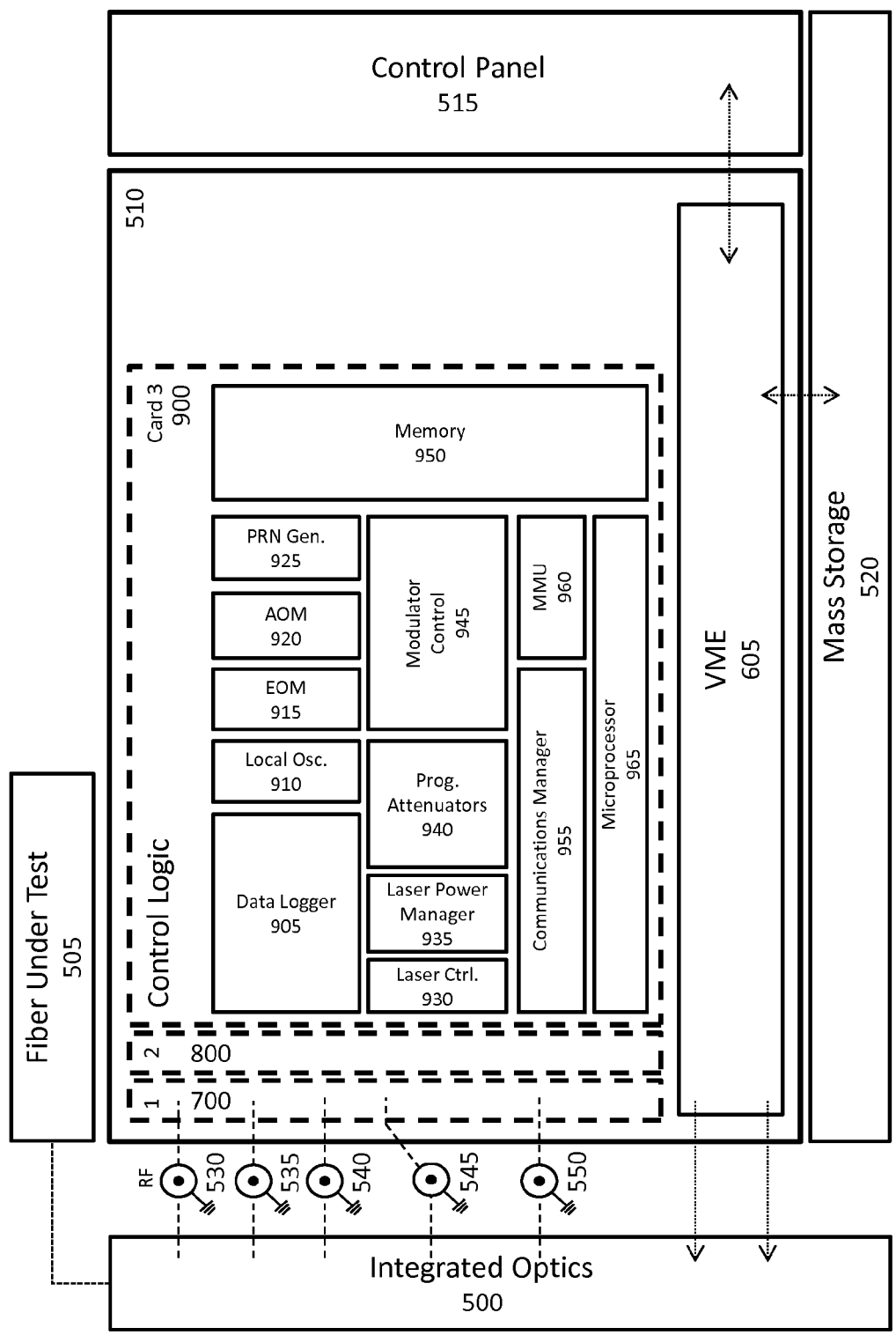
FIG. 5 depicts a third expansion card of FIG. 2—Control Logic 900 and Data Logger, referred to herein as Card 3.

FIG. 5 depicts a third expansion card of FIG. 2—Control Logic 900 and Data Logger, referred to herein as Card 3. Card 3 900 provides control logic to the system components. Card 3 900 comprises data logging logic 905, local oscillator (LO) control 910, EOM control 915, AOM control 920, pseudo-random noise (PRN) generator 925, laser control 930, laser power manager 935, programmable attenuators 940, modulator control 945, memory 950, communications manager 955, MMU 960, and microprocessor 965.

The data logger 905 provides the data logging logic including timestamps and multiplexing multiple signals IQ, IP, SQ, and SP (described further in FIGS. 6 and 7), into one signal and stores the information in binary. The local oscillator (LO) 910, EOM 915, and AOM 920 control logic provides control data to the corresponding hardware components. The pseudo-random noise (PRN) generator 925 provides a PRN code to the AOM. Laser control 930 and laser power manager 935 are used to monitor and control the laser. Programmable attenuator 940 and modulator 945 control the corresponding hardware components. The memory 950 is flash memory. Data is stored in mass storage 520.

Cards 1 through 3 700, 800, and 900 are required for basic data logging purposes. Additional cards are required to process and classify the logged data. Cards 1 through 3 700, 800, and 900 are not integrated into the base system. Allowing them to be modular allows for scaling processing capabilities to project-specific requirements, simple system upgrades, and rapid reconfiguration.

Figure 6:
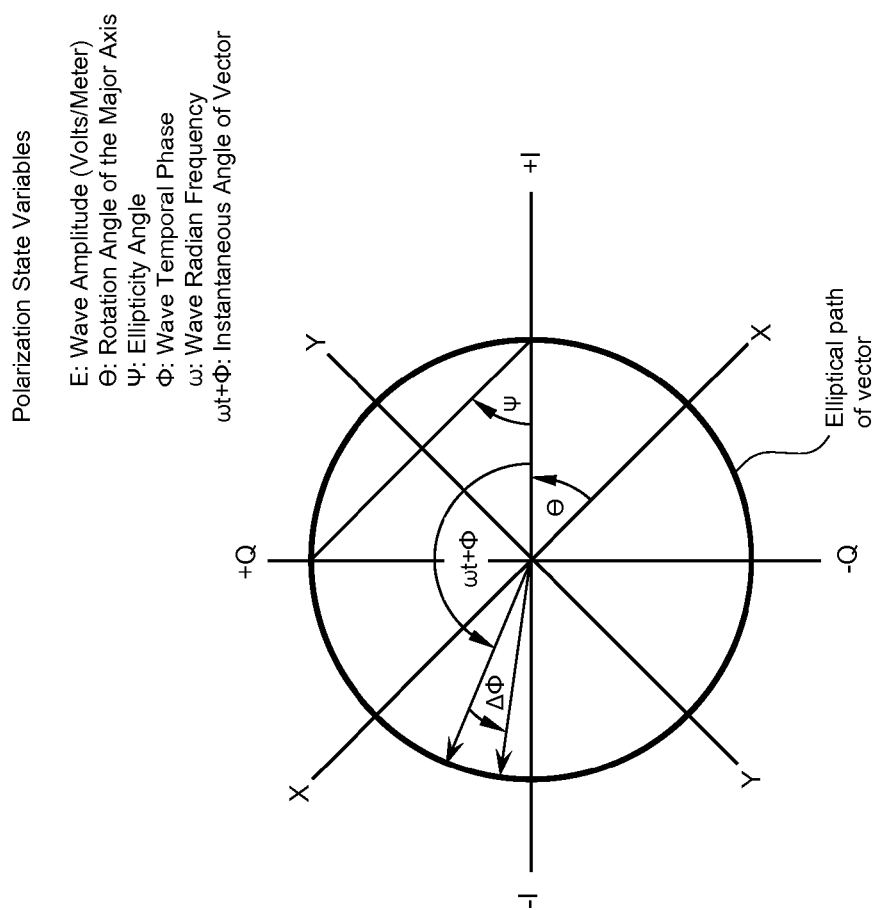
FIG. 6 is a graphical depiction of polarization.

The beat signal produced by the demodulation causes the phase of the vector to rotate through 360 degrees. In an ideal system with no impetus, the vector length would remain constant, describing a circle, as depicted in FIG. 6. This attribute is used to normalize the signal processing. Depending on the optional cards installed, this data may be monitored on the user interface in the form of Lissajou curves. Assigning the phase data to Cartesian coordinates with the in-phase (I) value as the x-axis and the quadrature phase (Q) value as the y-axis allows for conversion of each correlation value to a vector using an arctangent. The change in the angle of that vector ($\Delta\Phi$) from sample to sample yields the relative change in correlation strength, phase, for that particular zone. The result is the audio reading for the sample. The length of the vector indicates the power for the sample. Generally, the algorithms depicted in FIG. 6 are known in the art and are included as illustrative examples.

Figure 7:
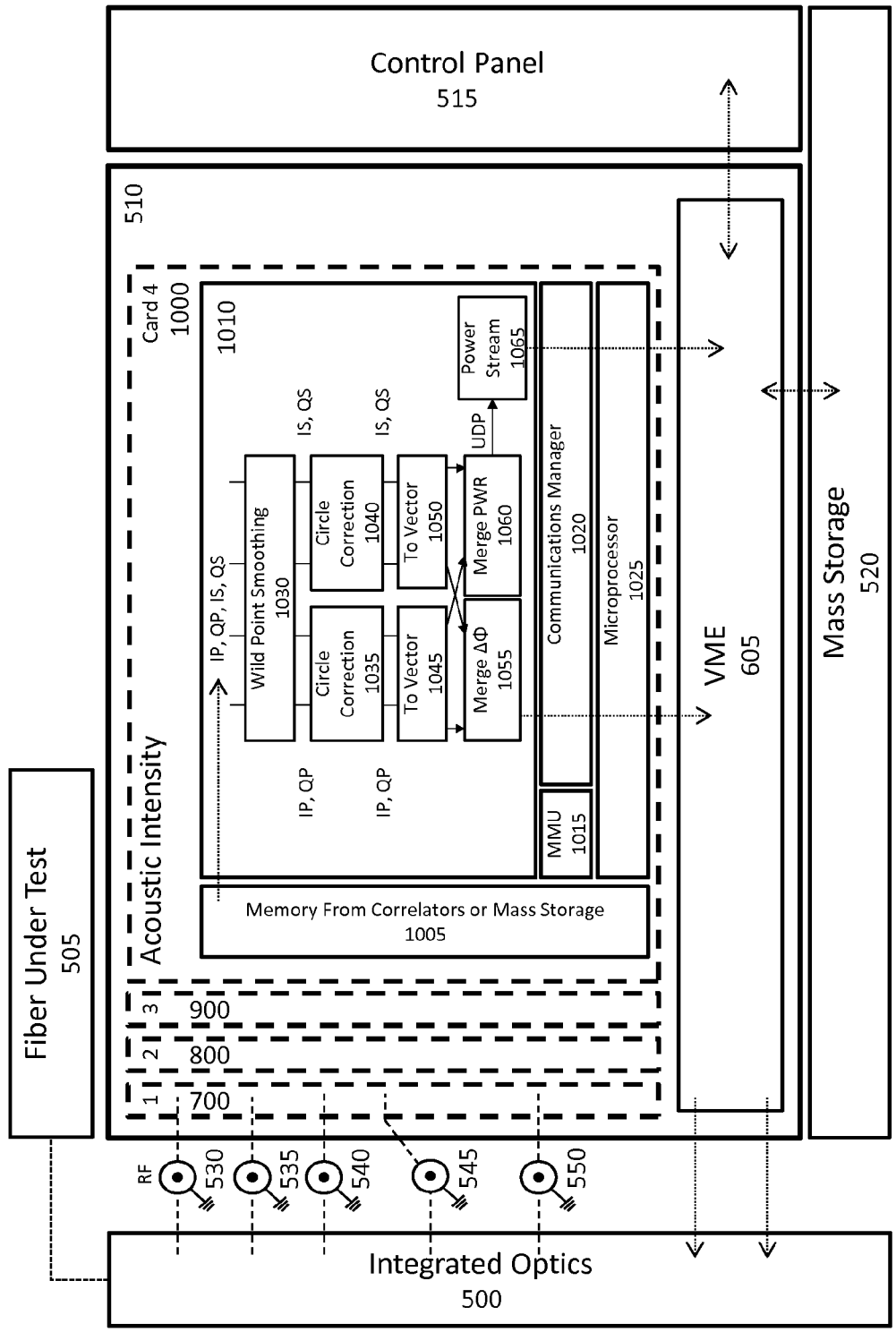
FIG. 7 depicts a fourth expansion card of FIG. 2—Acoustic Intensity 1000, referred to herein as Card 4.

FIG. 7 depicts a fourth expansion card of FIG. 2—Acoustic Intensity 1000, referred to herein as Card 4. The purpose of Card 4 1000 is to manage acoustic event intensity.

Figure 10:
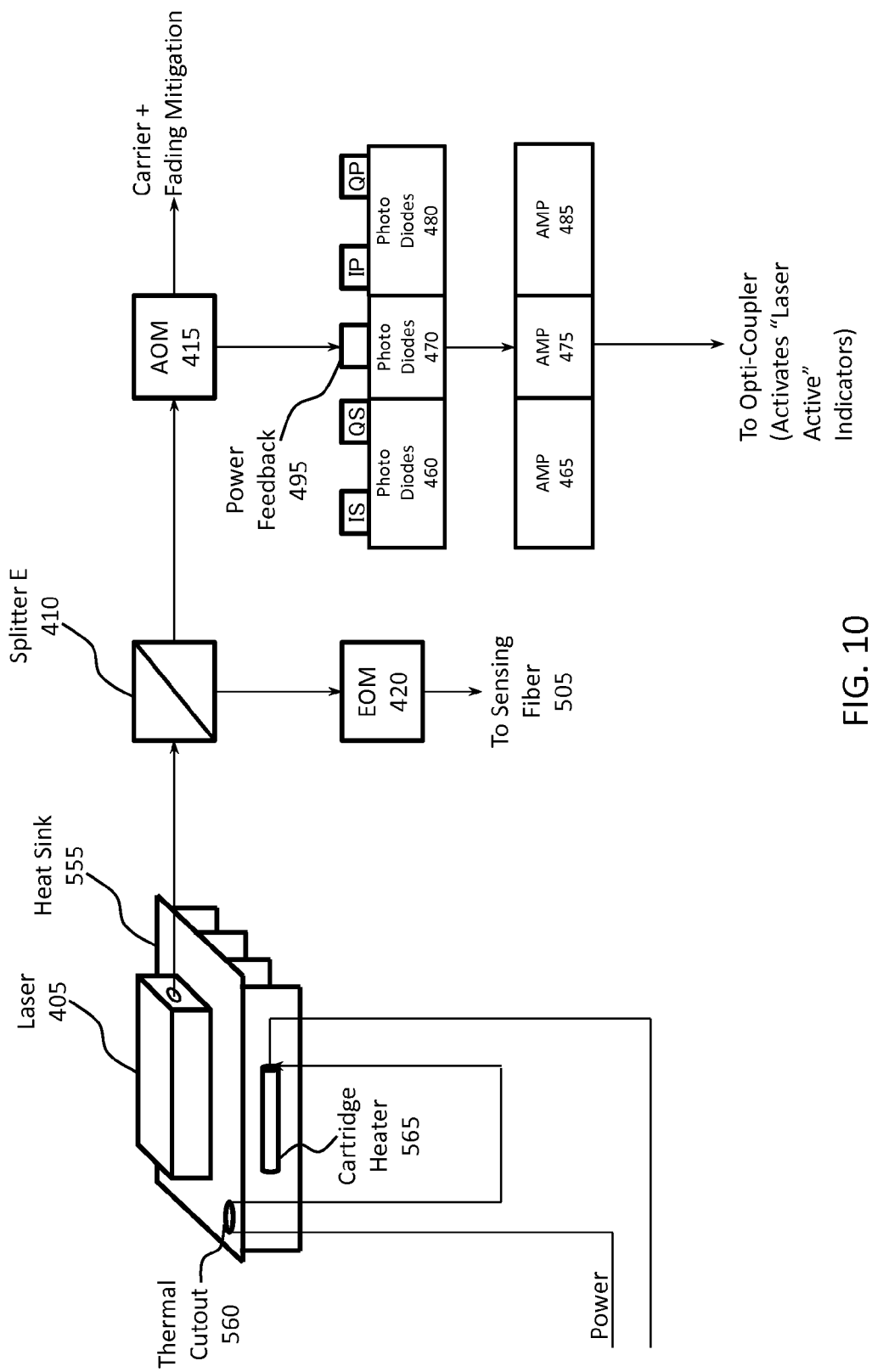
FIG. 10 depicts an example of a mechanical laser settings control system.

Telemetry data is retrieved from memory 1005 from one of the correlators or mass storage 520. The telemetry data, IP, QP, IS, and QS (further defined in FIG. 10 description: IP and QP represent quadrature data, 90° out of phase, for the "parallel" polarization from the fiber and IS and QS represent quadrature data for the "perpendicular" polarization), is passed through wild point smoothing 1030 to eliminate noise and fill in missing values, providing a cleaner output signal.

Once the signal has been smoothed, the P signal data and the S signal data proceed through separate circle corrections 1035 and 1040, respectively and then to vector 1045 and 1050, respectively. Change in phase ($\Delta\Phi$) data 1055 and power data 1060 is then merged from information obtained from both vectors 1045 and 1050. The resulting power and $\Delta\Phi$ data are the basis for the remainder of the signal processing. Change in phase data ($\Delta\Phi$) 1055 is transmitted to the VME 605.

Power data 1060 is transmitted via user datagram protocol (UDP) packet to power stream 1065 and finally to VME 605. Card 4 1000 may also include a microprocessor 1025, communications manager 1020, and a memory management unit (MMU) 1015.

Figure 8:
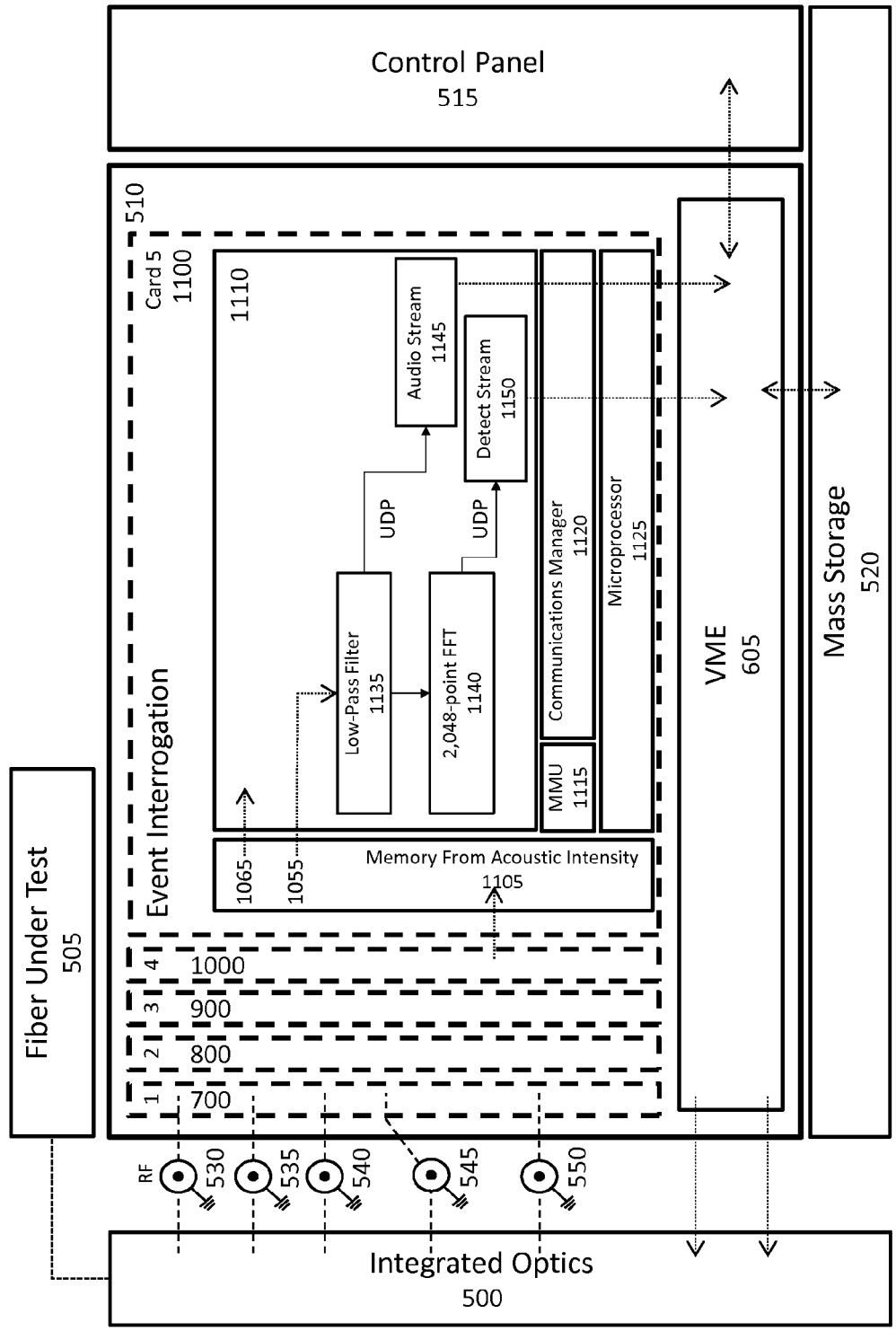
FIG. 8 depicts a fifth expansion card of FIG. 2—Event Interrogation 1100 and Demodulation, referred to herein as Card 5.

FIG. 8 depicts a fifth expansion card of FIG. 2—Event Interrogation 1100 and Demodulation, referred to herein as Card 5. Card 5 1100 provides additional functionality to Card 4 1000.

Change in phase data ($\Delta\Phi$) 1055 is retrieved from memory 1105 from one of Card 4 1000 or from mass storage 520. The $\Delta\Phi$ values from the two polarizations are combined in proportion to the power readings. The resulting power and $\Delta\Phi$ are the basis for the remainder of the DSP processing, which produces a series of products on various UDP ports, for consumption by other applications. The change in phase data ($\Delta\Phi$) 1055 is passed through low-pass filter 1135 to attenuate noise. In an example, the low-pass filter 1135 attenuates outside the range of 18 Hz to 300 Hz. The filtered signal is sent via UDP packet to the audio stream 1145.

A Fast Fourier Transform (FFT) 1140 is then performed on the change in phase ($\Delta\Phi$) 1055 values. The power spectrum of the FFT 1140 is computed and the standard deviation of the power spectrum is compared to the average power spectrum over time. The standard deviation becomes the detector data stream and can be used by other data analysis software as a first-order estimate of the level of activity in the corresponding zone. By monitoring the values over time and comparing the values to adjacent zones, analysis software can get a first indication that an event has occurred. Card 5 1100 merely indicates that an event has occurred—additional cards are necessary to process and classify the event. In an example, the FFT 1140 is run on 2,048 points. This number of points processed by the FFT 1140 limits resolution for feature discrimination in the detector stream. From the FFT 1140 the signal data is passed via UDP packet to the detect stream 1150. The resulting information is passed from the audio stream 1145 and the detect stream 1150 to the VME 605. Card 5 1100 may also include a microprocessor 1125, communications manager 1120, and a memory management unit (MMU) 1115.

Audio data are produced by subtracting the $\Delta\Phi$ values for any two zones. When the fiber stretches, the light is delayed from that point all the way down the fiber. Thus, the audio reading for the zones at the end of the fiber includes all of the stimuli that occurred on the entire length of the fiber. By subtracting the zone X value from the zone Y value, one gets only the stimuli that occurred between zone X and zone Y. In an example, audio streams can be produced for two or more zone pairs at a time.

Figure 9:
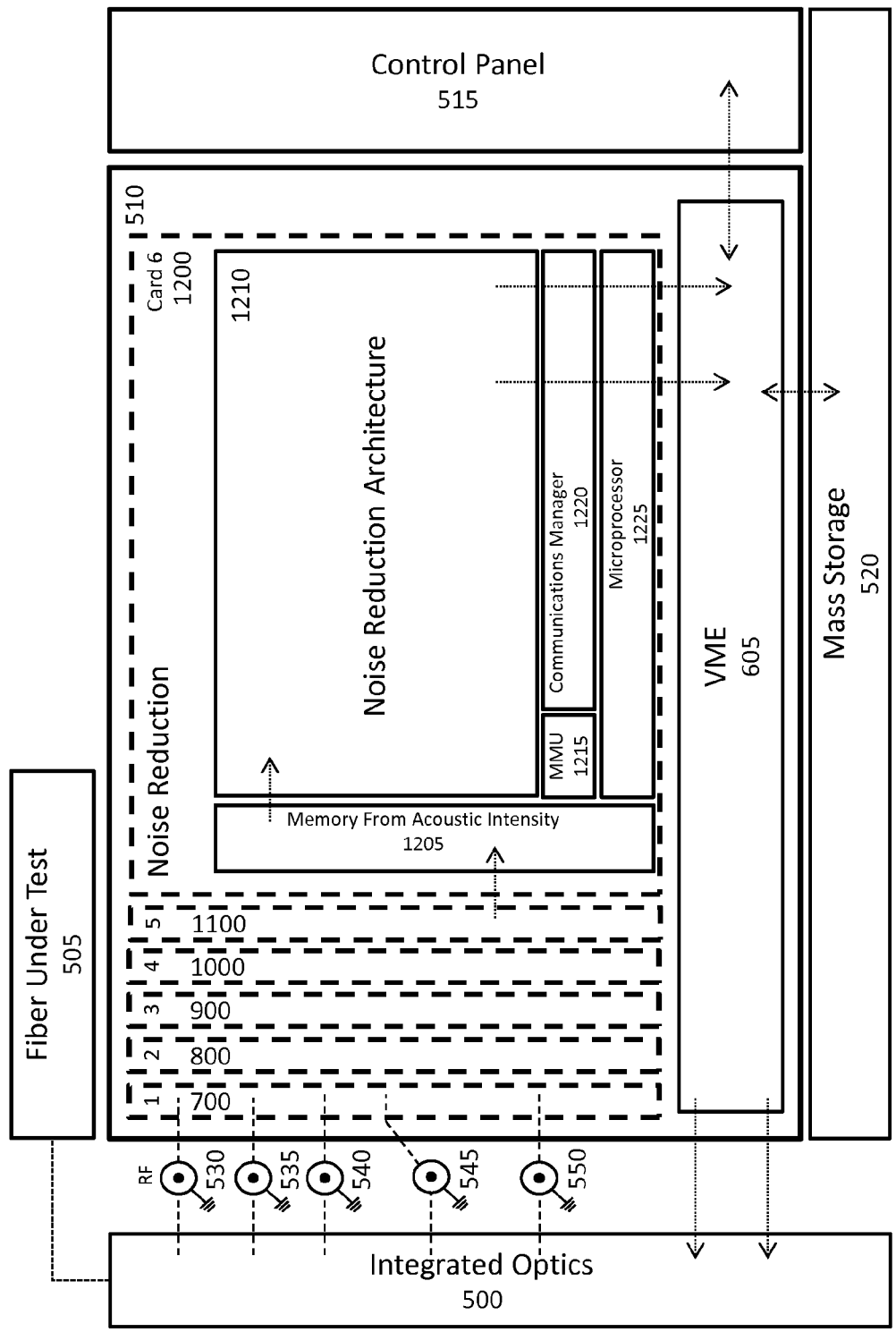
FIG. 9 depicts a sixth expansion card of FIG. 2—Noise Reduction 1200 and Classification, referred to herein as Card 6.

FIG. 9 depicts a sixth expansion card of FIG. 2—Noise Reduction 1200 and Classification, referred to herein as Card 6. The purpose of Card 6 1200 is to reduce signal noise to provide cleaner signal output. Cleaner signal output allows for more accurate classification of events.

The signal is passed to Card 6 1200 from memory 1205 from one of Card 5 1100 and mass storage 520 to noise reduction architecture 1210 where it is processed and passed to the VME 605. Card 6 1200 may also include a microprocessor 1225, communications manager 1220, and a memory management unit (MMU) 1215.

An interrogation light wave source may be generated by modulating the amplitude, phase, or polarization of a coherent light wave with a time-structured correlation code. The correlation code can be a series of pulses, chirps, binary sequences, or any other type of code which provides the required correlation characteristics. Therefore, delaying the correlation decoding/de-multiplexing function allows de-multiplexing of delay multiplexed signals identifiable by speed of propagation and distance of flyback travel.

Referring now to the integrated optics 500 of FIG. 1 in more detail, a laser 405 launches an interrogation signal into fiber under test 505 and retrieves light wave back propagation from a continuum of locations along the fiber span 505. Back propagation mechanisms may include Rayleigh Optical Scattering (ROS) and other effects generated within the optical fiber 505. ROS in an optical fiber 505 backscatters light incident upon the fiber 505. The incident light travels down the optical fiber 505 to the scattering point/region. At the scattering region the incident light is backscattered back up the optical fiber 505. As the light travels the round trip optical path (i.e., distance of flyback travel) any disturbances of the fiber 505 which increase or decrease the optical path length will cause the phase of the incident and backscattered light to be modulated. Suppose a pressure is applied to the optical fiber 505. The pressure elongates the path length of the light traveling through the region.

The backscattered wave arriving back at an optical coupler 435 from ROSE fiber optic array 505 passes into circulator 430. The backscattered light which arrives at circulator 430 is the summation of all light backscattered from a continuum of locations along the length of the ROSE fiber optic span 505.

Furthermore, the phase of the channel output at a first location will be the summation or integration of all pressure changes along the bi-directional path. This unusual phenomenon has been demonstrated with experimental hardware. Once the correlation process isolates the optical signal originating from a spatial region, the signal must be phase demodulated to extract the pressure information.

The system also applies to point-wise non-distributed sensors or artificially generated multiplexing by electronics means. The interrogation light wave can be intercepted and retransmitted back to the receiver with an artificial, electronically generated delay, as a means of delay/correlation multiplexing many channels. More particularly, the propagation of the optical spread-spectrum interrogation signal down the continuous full span of the optical fiber span 505, signal launch end to remote end, causes a back-propagating composite optical signal, which is the linear summation, or integration spatially, of all of the individual, continuous, or continuum of back-reflections along the span of the optical fiber 505.

One component of this composite signal is comprised of the naturally occurring continuum of optical back reflections (ROSE) of the optical spread spectrum carrier signal that is formed by modulating the primary carrier signal by the spectrum spreading signals. Another component is comprised of the artificially occurring optical back reflections, either-point wise reflections or distributed reflections, of the optical spread spectrum carrier signal that is formed due to propagation discontinuities as the result of presence of a fiber cable coupler 435 in span 505. Still another component comprised of the continuum of modulations at locations along the span of the reflected signals due to longitudinal components of optical path length change, causing a delay in the reflected signal, experienced by the fiber optical span 505 along its length.

Such optical path length change or delay may be caused by a variety of possible sources including acoustic pressure waves incident to the fiber 505, electromagnetic fields coupled to the fiber 505, mechanical strain or pressure on the fiber 505, thermal strain or pressure induced in the fiber 505, or other means of causing change in the optical path length. Use of the acoustic pressure wave's mode of changing path length in perimeter intrusion monitoring systems is the principle example illustrated herein. In this use, optical fiber span 505 is employed to provide an array of virtual geophones buried at a range of depths beneath the surface of the ground of about between six to eighteen inches, to sense motion of an object on the surface of the ground. The acoustic pressure wave sensing mode is also useful to sense seismic signals, as for example as linear arrays inserted into casing structures of existing oil wells. Predetermined artificial pressure wave producing shocks are imparted into the ground, and the responses from the sensor are used to locate secondary oil deposits. The acoustic pressure wave sensing mode is further useful for employing span 505 as an array of virtual hydrophones, with the media which couples the signals to the hydrophones at least in part being the body of water in which the array is immersed. Such hydrophone arrays find use as naval undersea warfare towed arrays, or towed geophysical exploration arrays. In the latter the arrays respond to artificially produced shocks of predetermined character and location induced in the body of water, and the response of the array to bottom return signals are used to locate ocean bottom geophysical feature indicating likely presence of an oil deposit. Yet further, a sensing position on a fiber span 505 could be used to receive as input microphonic signals suitably imparted to the region of the sensing position. The electromagnetic field sensing mode of fiber span 505 could be used for monitoring electronic signals along a telecommunication cable's span to localize malfunctions. Responses of fiber span 505 to mechanical, pressure or thermal strains can be used in systems for monitoring such strains.

An alternate example of fiber 505 is to provide fiber of a polarization preserving or single polarization, optical fiber. The polarization preserving fiber of this type holds the backscattering light in a narrow range of polarization states so that a substantially single RF signal enters a single set of correlators, reducing the complexity of the system.

The correlation code generator creates a signal that has a broad bandwidth. The broadband nature of the correlation code is required to obtain the desired properties in the signals autocorrelation function. The calculation and definition of the autocorrelation function of any general signal is well known and defined in signal processing literature. The correlation code signal is structured such that its autocorrelation function is highly peaked at zero delay, and is very small away from zero delay. This criterion is well known to those of skill in the art and is the essence of why the correlation code has a broad bandwidth. Any signal that has the desired autocorrelation function properties can be used as the correlation code. There are many reasons for choosing one correlation code over another: ease of creation; autocorrelation properties; cost of creation hardware; cost of correlation hardware; and effectiveness in producing spread spectrum signal effects. In some configurations, the correlation code can be a binary sequence with a desired transorthogonal autocorrelation property (sometimes called a pseudonoise sequence), a pseudorandom number (PRN) sequence with the desired autocorrelation property, chirps, or other types of signals which provide correlations code having predictable non-repetitive behavior. The foregoing list of types of sequence signals which may be employed to modulate the carrier light wave signal includes both "binary pseudonoise sequences" and "pseudorandom number (PRN) sequences." For purposes of construction of this specification and the appended claims, these terms are employed as they are defined under the listings "Pseudonoise (PN) sequence (communication satellite)" and "Pseudorandom number sequence" at pages 747 and 748 of the "IEEE Standard Dictionary of Electrical and Electronic Terms" (Fourth Edition), which listings are herein incorporated by reference in their entirety. Further for purposes of construction of this disclosure, it is deemed that "binary pseudonoise sequence" is generic and "pseudorandom number sequence" is a species thereof. Still further for purposes of construction of this disclosure, both terms are deemed to include analog signal forms of sequences as well as digital signal forms.

The temporal length of the code sequence which is reiteratively produced by generator may be either less than the time period for propagation of a light wave to the remote end of span and propagation back of a backscattering (i.e. distance of flyback travel), or greater than this time period. It cannot be equal to this period.

Refer to FIG. 1. The local oscillator and composite light waves are interfered on photo diodes 460, 470, and 480 producing an electronic signal which electronically represents the heterodyned optical interference power between the two light waves. The resulting composite radio frequency signal at outputs from the amps 465, 475, and 485 represent electronically the composite light wave signal. The composite electronic receiver signal is passed to the correlator system (FIG. 4). The local oscillator light wave on optical path 13 is interfered with the composite light wave on optical path 11. The interference power is photo-detected in photo diodes 460, 470, and 480 by optically interfering with the composite back propagating light wave on the local oscillator signal. As one of the components of this interfering action, there is produced a difference beat signal which is a composite radio frequency representation of the composite light wave on optical path 11.

This interfering of the local oscillator 710 (FIG. 3) output light wave and the composite back-propagating CW light wave 11 provides the translation of signal 11 from the optical domain to a CW radio frequency (RF) composite difference beat signal output from the amps 465, 475, and 485. This reduces the frequency of signal into an electronically processable signal frequency range. It is to be appreciated that the RF composite difference signal produce by this translation action includes having counterpart components of the aforesaid components of the composite back-propagating light wave signal, with the phase states of these counterpart RF domain signals the same as the phase states of the corresponding components of the back-propagating light wave.

In some examples, more than one light source is used. The lasers are to have sufficiently stringent high performance capability with respect to exactness of frequency to enable interference effects there between and heterodyne detection of acoustic perturbation signals incident to fiber 505 to produce beat frequencies within the radio frequency (RF) range. Also in accordance with examples, lasers have stringent performance criteria with respect to the phase stability, or coherence, of their beams. They are to be substantially coherent over at least a propagation path distance substantially equal to twice the length, L, of sensing fiber 505.

Each of the programmably selectable pairs of differenced phase signals form a signal which is spatially bounded within the region of the fiber between zones. The phase differencer therefore produces differential phase outputs corresponding to a set of virtual sensors with programmable length and position.

Stated another way, each programmable selection of pairs of phase signals forms a virtual spatial differential sensor which senses the difference between the phases of the output of the photo diodes 460, 470, and 480. Each output is an RF difference beat signal representative of the aforesaid "still another" component of the composite back-propagating CW light wave signal which passes from the launch end of fiber span 505 to directional coupler 435. These signals from each pair therefore represent signals of virtual spatial differential sensors along fiber span 505. As a result of the choice of pairs being selectively programmable these virtual sensors can be employed to implement adaptive apertures in processing signal incident the fiber span 505. This feature would be useful, for example, in enabling security system operators to classify objects causing acoustic pressure wave signals incident up a fiber span 505 used as a perimeter intrusion monitoring line.

Referring to an example of FIG. 4. The composite radio frequency signal, or RF composite reference beat signal, which electronically represents the received time-delay multiplexed optical signal, or composite back-propagation CW light wave is input into the correlator system 810. The composite radio frequency signal is n-way split with power splitter into a plurality (which can be multiple thousands or more) of electronic pathways. The master correlation code is input into the correlator system 810. The correlation code is distributed to such a plurality of programmable delay circuits. Each programmable delay circuit delays the master correlation code by the delay required to decode/de-multiplex each time-delay multiplexed channel. The plurality of programmable delay circuits output a plurality of delayed correlation codes. Each of the outputs therefore produces the corresponding de-multiplexed signal which is time-gated by the corresponding time-delay of the correlation code.

These spatial delays are based on the time of propagation for flyback travel along these distances, which are arbitrary and programmable. The time delay multiplexing of the optical signals comprising the composite back-propagating optical signal arise from a plurality of spatial locations causing a like-plurality of time-delays. The correlator system spatially separates the components of the RF composite difference beat signal into channels which each uniquely represent an optical signal at a single spatial location. The correlator system allows the spatial sampling of the optical signals so that a virtual array can be formed along the fiber span 505 on FIG. 4

As an alternative example to the viewpoint inferable from the preceding sequence discussing FIG. 4, integrated optics 500 may be considered as partitioned into: (i) an optical network for illuminating an optical fiber sensing span, or other light propagation medium sensing span, and retrieving back propagating portions of the illumination; and (ii) a photoelectronic network for establishing virtual sensors at predetermined locations along the span and picking up external physical signals incident to, or impinging upon, the sensors.

In general, the optical network for the illumination of and for the retrieval of back-propagation from fiber span 505 comprises transmitter laser 405, directional optical coupler 435, and optical fiber, or other light propagation medium 505.

The photoelectronic network for establishing virtual sensors and picking up signals therefrom generally comprises two subdivisions. One subdivision provides a cyclically reiterative autocorrelatable form of modulation of the light wave illuminating fiber span 505. This modulation is in the form reiterated sequences having autocorrelatable properties. The other subdivision takes the retrieved back propagation and performs a heterodyning therewith to obtain an RF beat signal. It then picks up the signal from the virtual sensors by autocorrelation and further processes it into more useful forms.

In general, the subdivision providing the cyclical reiterative modulation of sequences illuminating fiber span 505 comprises a master correlation code generator (via one of its electrical pathway outputs) and electro-optical modulator 420.

According to an alternate example, the system elements which perform the autocorrelation enable providing an output in the form of an RF counterpart of a light wave time-domain reflectometry output of signals incident to the virtual sensors as light wave time domain reflectometry outputs a CW light wave modulated by a continuously reiterated binary pseudorandom code sequence is launched into an end of a span 505 of ordinary optical fiber cable. Portions of the launched light wave back propagate to the launch end from a continuum of locations along the span 505 because of innate fiber properties including Rayleigh scattering. This is picked off the launch end and heterodyned to produce an RF beat signal. The RF beat signal is processed by a plurality (which can be thousands) of correlator type binary pseudonoise code sequence demodulators respectively operated in different delay time relationships to the timing base of the reiterated modulation sequences. The outputs of the demodulators provide RF time-domain reflectometry outputs representative of signals (e.g., acoustic pressure waves) incident to virtual sensors along the fiber at positions corresponding to the various time delay relationships.

According to an alternate example, the system elements performing the autocorrelation enable detection of unique spectral components representing phase variations of external signals incident to the virtual sensors. A CW light wave modulated by a continuously reiterated pseudorandom code sequence is launched into an end of a span 505 of ordinary optical fiber cable. Portions of the launched light wave back propagate to the launch end from a continuum of locations along the span 505 because of innate fiber properties including Rayleigh scattering. This is picked off the launch end and heterodyned producing an RF beat signal. The RF beat signal is processed by a plurality (which can be thousands) of correlator type pseudonoise code sequence demodulation and phase demodulator units, operated in different time delay relationships to the timing base of the reiterated modulation sequences. These units provide outputs representative of phase variations in respective unique spectral components in the RF beat signal caused by acoustic signals, or other forms of signals, incident to virtual sensors at fiber positions corresponding to the various time delay relationships.

According to an alternate example, a pair of the different delay time relationships of the autocorrelation system elements are effective to establish a virtual increment of the optical fiber span, and that a substractor (where the substractor is a circuit that is capable of subtracting numbers, in particular, binary) circuit of a phase differencer (where the differencer is used to determine differences between the signals) enables representing the differential phase signal across the virtual increment. A CW light wave modulated by a continuously reiterated pseudorandom code (PRC) sequence is launched into an end of a span of ordinary optical fiber cable. Portions of the launched light wave back propagate to the launch end from a continuum of locations along the span because of innate fiber properties including Rayleigh scattering. This is picked off the launch end and heterodyned producing an RF beat signal. The RF beat signal is processed by a plurality (which can be thousands) of correlator pseudonoise code sequence demodulation and phase demodulator units operated in different delay time relationships to the timing base of the reiterated modulation sequences. Pairs of outputs of the units are connected to respective substractor circuits, each providing a signal representative of phase differential of incident acoustic signals, or other forms of signals, across virtual increments of the span established by a pair of said delay time relationships.

Example configurations enable the interrogation of ROSE fiber optic sensors, and the spatial sorting and separation of the temporal optical phases of backscattered optical signals arising from a plurality of virtual optical sensors along fibers or other optical mediums. Examples also enable the spatial decoding of backscattered optical signals with a bandwidth of tens of kilohertz. Examples also enable the sensor locations along the fiber to be programmable, and allow the electronic separation or segmentation of the array of fiber sensors into programmable bounded lengths and positions. Because the correlation signal can be designed to be a continuous wave, example configurations increase the average optical power considerably over conventional pulsed optical phase sensor interrogation methods. Because the correlation signal can be chosen to have spectrum spreading properties for which despreading (where despreading means to recombine signals that have been spread or distributed) electronic circuitry is readily available, optical fiber system noise, such as reflection discontinuity noise due to cable couplings, can be materially attenuated.

According to some configurations, a new capability of heterodyne optical phase detection without resorting to dithered phase carrier methods is disclosed. The phase demodulation method introduces heterodyne I & Q demodulation to produce cosine and sine phase components, clipped signal amplitude stabilization techniques and digital signal processing based phase detection. The spatially differential phase detection method described enables the rejection of unwanted lead-in fiber phase signals.

Distributed acoustic sensing using multimode fibers is performed using essentially the same methods as with single mode fibers. Narrowband pulses of laser light are generated in an optical source and the light is launched through a beam splitter or coupler into the sensing fiber. In the multimode sensing fiber, the light pulses undergo coherent Rayleigh backscattering and are reflected back, toward the optical source. When the backscattered pulses reach the beam splitter or coupler, they are directed towards one or more photodetectors via a multimode return fiber rather than being allowed to return to the light source. Light leaving a fiber, either single mode or multimode, exits in a characteristic cone related to the fiber's numerical aperture. An optional lens may be positioned between the terminal end of multimode return fiber and the photodetector(s) in order to better control the spreading of the beam as it exits fiber. Data signals from the photodetector(s) is fed via amplifiers and data acquisition modules to a signal processing module that performs DAS signal analysis using techniques known in the art.

The distance between the photodetector(s) and the terminal end of fiber or lens is predetermined by testing such that only one or a few modes are detected. Limiting the number of modes received by the photodetector(s) improves the contrast of the interference signals produced by coherent Rayleigh scattering and makes possible the use of multimode optical fibers in DAS. In an alternate example the distance may be either automatically or manually adjustable to achieve optimum performance.

DAS signals are notorious for optical fading, where the signal strength is time dependent due to slowly varying changes in the fiber that result in changes in the optical path length between the interfering Rayleigh scatterers in the fiber. By using a tested and preselected distance in conjunction with the photodetector(s), and thereby detecting one or a small number of modes, the system can be optimized for the photodetector(s) to generate the best signal for DAS analysis. Multiple detectors can be used to ensure that good quality signals are received along the entire fiber by using a combination of detectors that individually measure good quality signals only at limited locations along the sensing fiber. Multiple detectors, each responding to a single mode or a few modes, can eliminate signal fading.

Example for Laser Stabilization

As background it is not understood well in the art of interferometry the importance of keeping the temperature and power output of the laser light source stable. As laser temperature decreases, laser power output increases. As power output increases, signal strength increases. Increasing signal strength comes with an increase in background noise. As the laser power output is stabilized, the noise will also stabilize. If the noise is stable over time, it can be modeled and removed during signal processing. If the noise deviates from the noise removal model, i.e. due an unanticipated change in laser power and/or temperature, the noise model will no longer fit actual noise and additional background noise will be present in the output signal. In an exemplary example the target laser power output is between 210 mW to 220 mW, however, other ranges are possible.

The laser and electronics may need to warm up for 15 to 30 minutes in order to achieve proper operation before reliable data from the sensor array can be gathered. The amount of time it takes to warm up is largely dependent on ambient air temperature. Generally, if the ambient air temperature is below 40° C. recommended warm-up time is about 30 minutes. For ambient air temperature above 50° C. the recommended warm-up time is generally about 15 minutes. Optimal operating temperature for laser electronics is generally around room temperature (21° C.). It should be noted that these values are merely generalizations as they are dependent upon the equipment used in the system.

The actual laser power will fluctuate when the system is first powered up until the temperature stabilizes. In an exemplary example, the laser power will fluctuate in the range of 215 mW to 235 mW when it is first powered up. This is normal, as the laser controller maintains the proper laser wavelength. The laser of this example is power adjustable. In the example, the laser power output may be adjusted manually and/or automatically.

In the base mechanical system the laser temperature in the optical fiber sensing system needs to be kept within a specified range (dependent upon laser type and model) to prevent variations to the output power which could increase background noise. In one example, depicted in FIG. 10, laser settings controls are mechanical. This example may comprise a laser 405, a heat sink 555, a cartridge heater 565, and a thermal cutout 560. The laser 405 of the example has control electronics built into the laser head including temperature and power output control. In this example, a target temperature or power can be input into the laser control system and the laser control system itself will manage temperature or power and attempt to keep it within a predetermined range (specified by user and/or range specific to laser product capabilities and application). In an exemplary example a JDSU NPRO 126 laser is used; however, other lasers may be used. The laser 405 may be coupled to a heat sink 555. To compensate for a cold start, the laser 405 will not turn on until a specified base temperature is reached on the heat sink 555. When the heat sink 555 reaches the specified temperature, the heater 565 will switch off to avoid overheating. In this example, the heater 565 is controlled with a thermal cutout 560. In some examples an additional thermal cutout may be incorporated that is set to open up at an upper limit. The additional thermal cutout would be set to the upper temperature limit of the installed laser 405.

Figure 11:
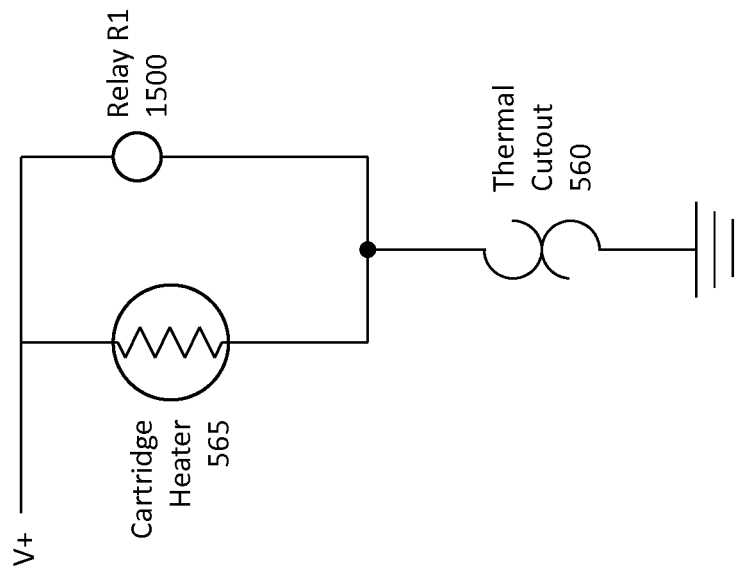
FIG. 11 depicts a heater control circuit.

FIG. 11 depicts the heater control circuit. The thermal cutout 560 closes the heater control circuit when the temperature is below a predefined threshold. When the heater control circuit is closed, the heater 565 will turn on. In an exemplary example the predefined threshold is 10° C. When the thermal cutout 560 is closed, relay R1 1500 is opened and the laser interlock is disabled. When the temperature is within the normal range (as specified by system components), i.e. normal operation, the thermal cutout 560 will be open and thus the heater control circuit will be open.

Figure 12:
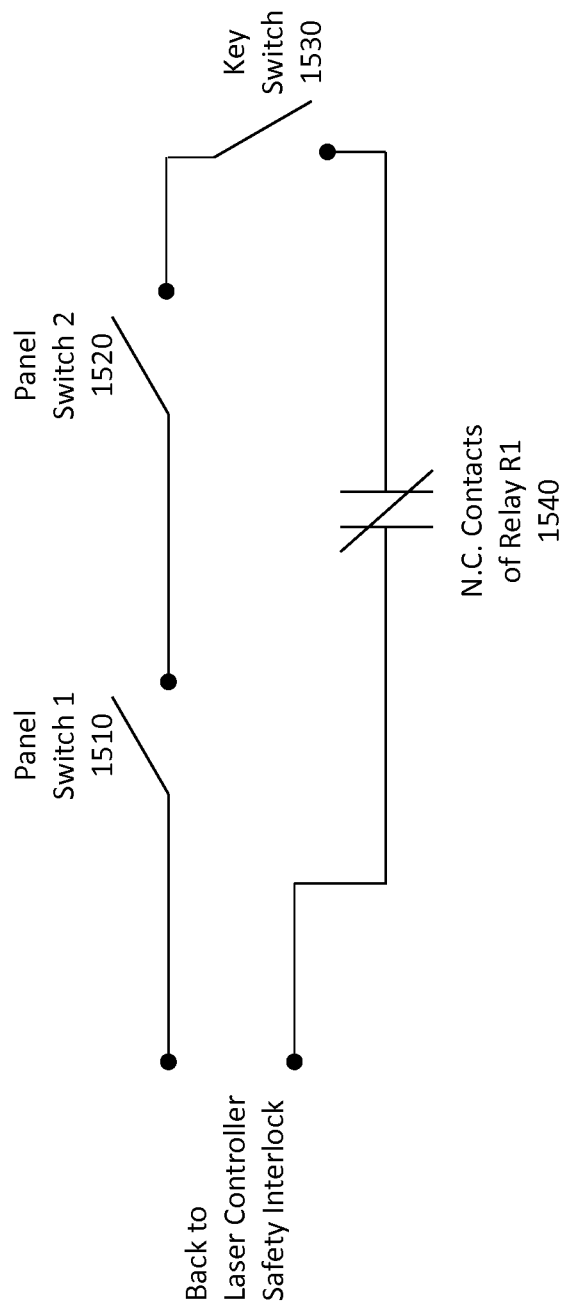
FIG. 12 depicts a laser interlock control circuit.

FIG. 12 depicts the laser interlock control circuit. The panel switch 1 1510, panel switch 2 1520, and key switch 1530 are all normally open. The laser interlock control circuit will only allow laser operation when all three switches are closed and relay R1 1500 (FIG. 11) is not energized. The normally closed (N.C.) contacts of relay R1 1540 open when the thermal cutout 560 (FIG. 11) closes the heater control circuit and the heater 565 (FIG. 10) is on. Relay R1 1500 (FIG. 11) is in parallel with the heater 565 (FIG. 10) and thus will energize when the thermal cutout 560 is closed, regardless of heater 565 (FIG. 10) operation. In examples with an upper limit thermal cutout, the cutout would be placed between normally closed (N.C.) contacts of relay R1 1540 and key switch 1530 to open the interlock circuit as a safeguard against and overheating of the laser.

To fulfill safety requirements, a key switch 1530 is implemented that can disable laser operation to keep light from being launched down the fiber during maintenance, etc. The laser enclosure is a sealed box with two normally open pressure switches (1510 and 1520) that are closed when the enclosure cover is in place. If the cover is removed, the switches (1510 and 1520) open and disable the laser 405.

Referring again to FIG. 10, the light from the laser 405 is launched into a splitter E 410. The splitter E 410 may split the power in half or in different percentages. In some examples, a larger portion of the laser output power splits off to an electro-optical modulator (EOM) 420 where it is modulated before continuing on to interrogate the sensing fiber 505. The remaining portion of the output power is split off to an acousto-optical modulator (AOM) 415 where it is again split. A portion continues from the AOM 415 to carrier and fading mitigation. Fading mitigation occurs in the mixer 525 circuit of the integrated optics 500 (FIG. 1). The remaining portion travels to the photo diodes 460, 470, and 480. In the depicted example, the photo diodes 460, 470, and 480 together comprise five ports. Four of the ports are used for the quadrature information where IP and QP represent quadrature data, 90° out of phase, for the "parallel" polarization from the fiber and IS and QS represent quadrature data for the "perpendicular" polarization. The fifth port is a test port which receives power feedback 495 from the AOM 415. The signal then travels through an amplifier 465, 475, and 485 where it is amplified and sent on to an opti-coupler which activates the "Laser Active" indicators.

The Mechanical System with the Microprocessor

Figure 13:
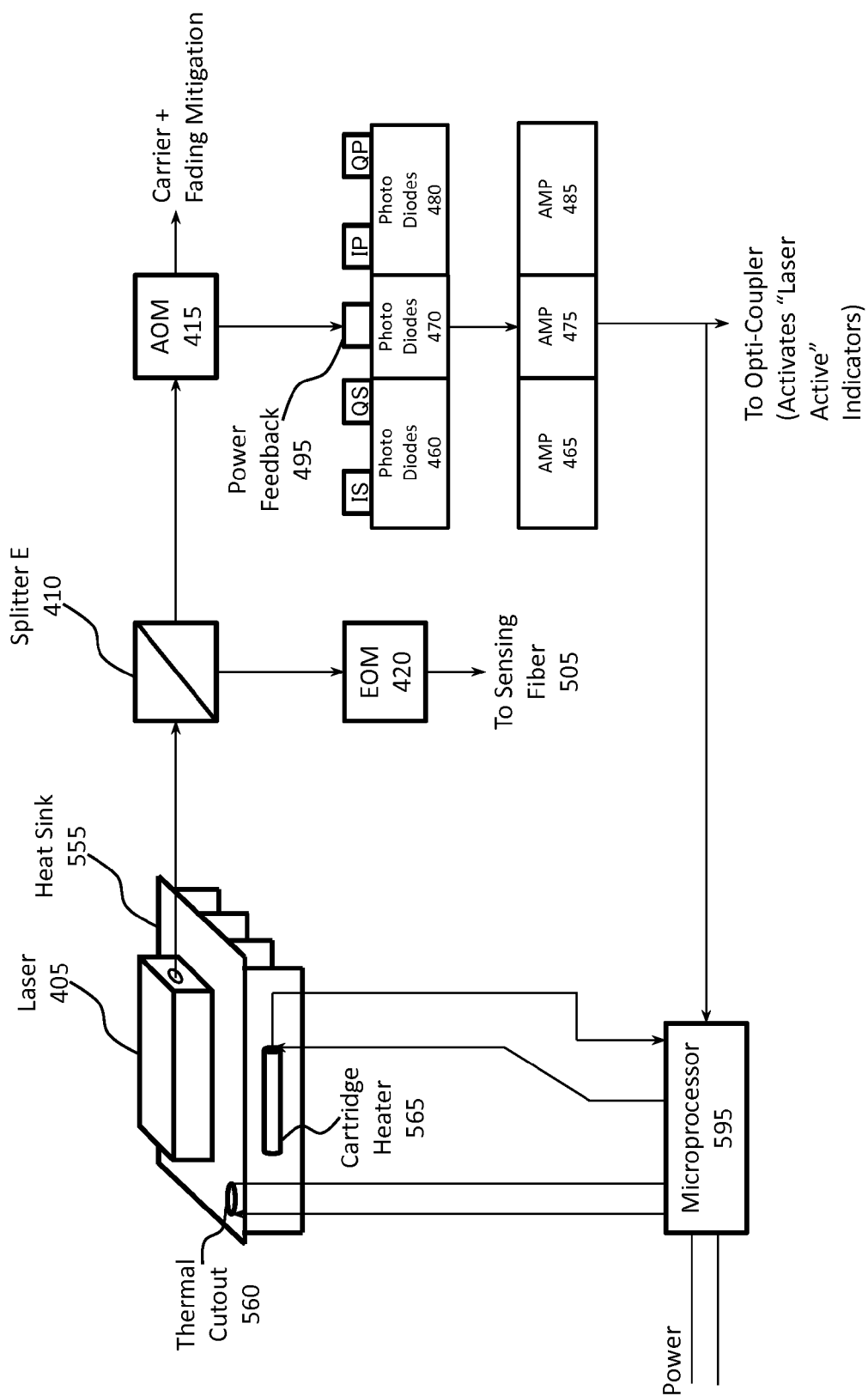
FIG. 13 depicts an example for the laser settings control system of FIG. 10 wherein the mechanical controls are supplemented and/or replaced by microprocessor control.

In one or more examples a microprocessor 595 may replace or augment the thermal cutout 560. In an example of FIG. 13, where the microprocessor 595 augments the thermal cutout 560, the microprocessor 595 will use system data to control operation of the thermal cutout 560. In some examples the thermal cutout 560 may be replaced by a Variac style switch, wherein the temperature may be variably controlled. This example allows for more precise control of laser temperature and therefore provides better laser stabilization. In examples where the microprocessor 595 replaces the thermal cutout 560, the microprocessor 595 will control heater 565 operation directly. In some examples, the microprocessor 595 may control the heater 565 directly, and a thermal cutout 560 may remain in the system as a redundant safety mechanism to prevent the laser 405 from becoming too cold.

Figure 14:
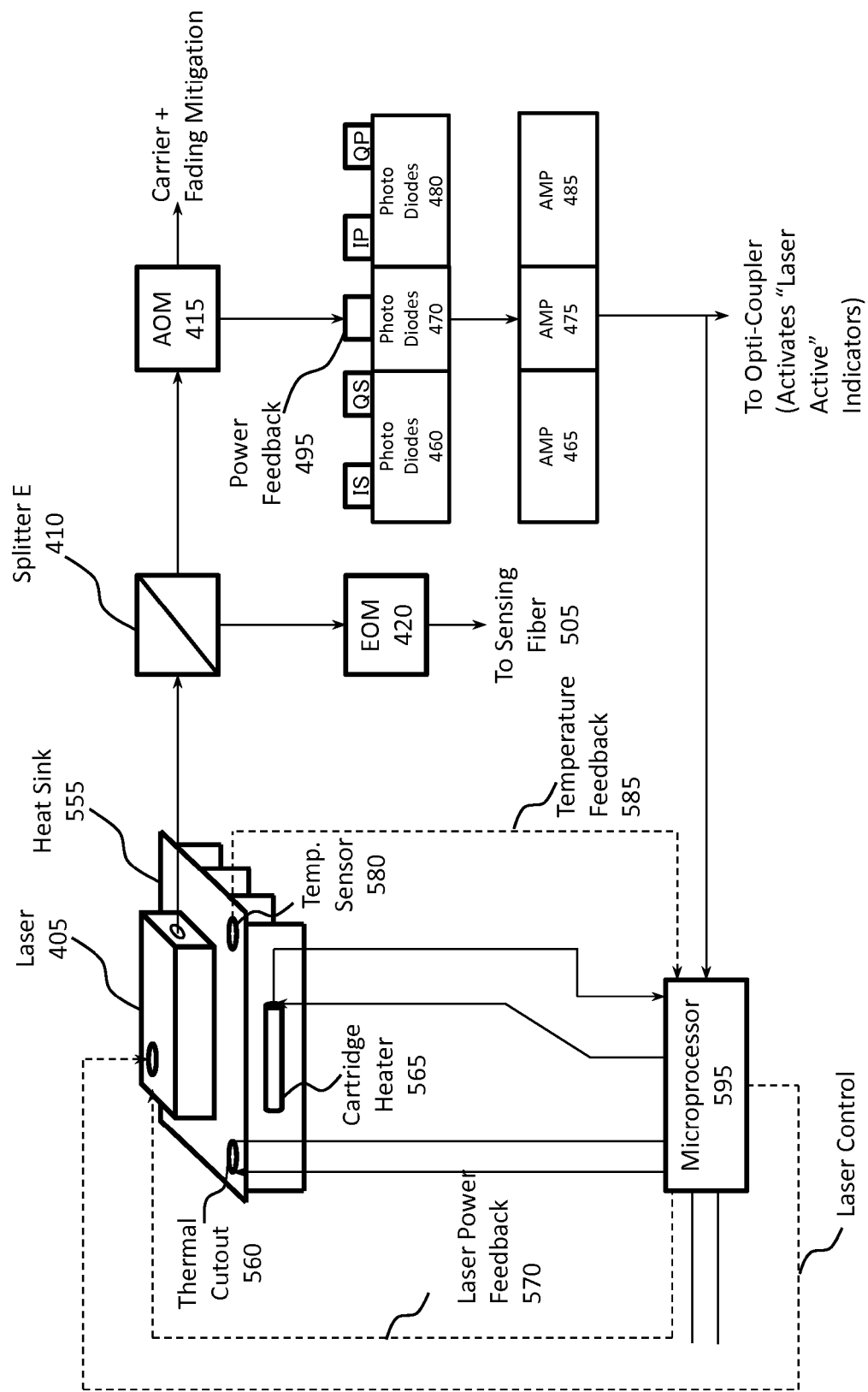
FIG. 14 depicts an example on the laser settings control system of FIG. 10 wherein both laser temperature and laser output power may be monitored and the data may be fed back to a microprocessor.

In another example, a microprocessor 595 and feedback loop as depicted in FIG. 14, both laser temperature and laser output power may be monitored and the data may be fed back to a microprocessor 595. The microprocessor 595 will dynamically control the laser temperature based on system data. The laser power may be monitored at the fifth channel (power feedback 495) of the photo diodes 470 and the data may be sent to the microprocessor 595 continuously in real time, or periodically according to user preferences and/or system processing power. The laser power data may be used to ensure that the laser is working at optimal power output. Any fluctuations in output power will cause the microprocessor 595 to react to stabilize the power output. The microprocessor 595 receives temperature information 585 from one or more sensors located in proximity to the laser 405. The microprocessor 595 receives laser power information from power feedback channel 495 and uses it to adjust the laser power 570. The microprocessor 595 controls laser operations through laser control 575.

In another example, systems and methods are disclosed for a hardware control panel. In some examples, the hardware containment mechanism(s), including a box or boxes, may comprise one or more hardware control panels. In some examples the hardware control panel(s) comprises at least one of: one or more hard switches such as on/off for one or more components, a total reset button, fan speed controls, etc. In some examples, all functionality provided on the hardware control panel(s) is present in the software. In some examples the hardware control panel(s) serves as physical control backups to operate or shut down system hardware in the event of software failure. In some examples the hardware control panel(s) may further comprise one or more visual displays indicating power levels, temperatures, fan speeds, etc. The software control panel includes a diagnostics tab that can be used to check the hardware for any potential issues. The hardware containers (which may be one or more boxes or other containment systems) may include one or more mechanisms to reduce system noise such as sound dampening, vibration dampening, and drop protection.

In some examples, a known strain may be induced on the fiber in order to change the refractive index in a known manner. This allows more accurate readings of disturbances in the vicinity of the fiber. Also, different zones may have different noise floors depending on the environment of the area surrounding them (for instance, one area may be near a river which would increase the noise floor).

In some examples, systems and methods are used for various coupling techniques designed to elevate the detection threshold of fiber optic based sensing systems. Techniques include fiber optic cable being positioned within a pipe and coupled with a filler material, laying fibers parallel with different depth relationships, laying fiber in a triangular wave pattern, placing a reflector beneath the plain fiber or pipe test section such that the signal is reflected back up as an echo, increasing the soil hydration, overlapping fiber in a grid configuration, and separation of soil regions by bulkheads. These configurations provide elevated detection thresholds useful for multiple purposes such as predicting future movement and directionality. Note that in this specification the term "section" refers to segments of fiber and the term "region" refers to an area of soil or other material surrounding the fiber.

Figure 15A:
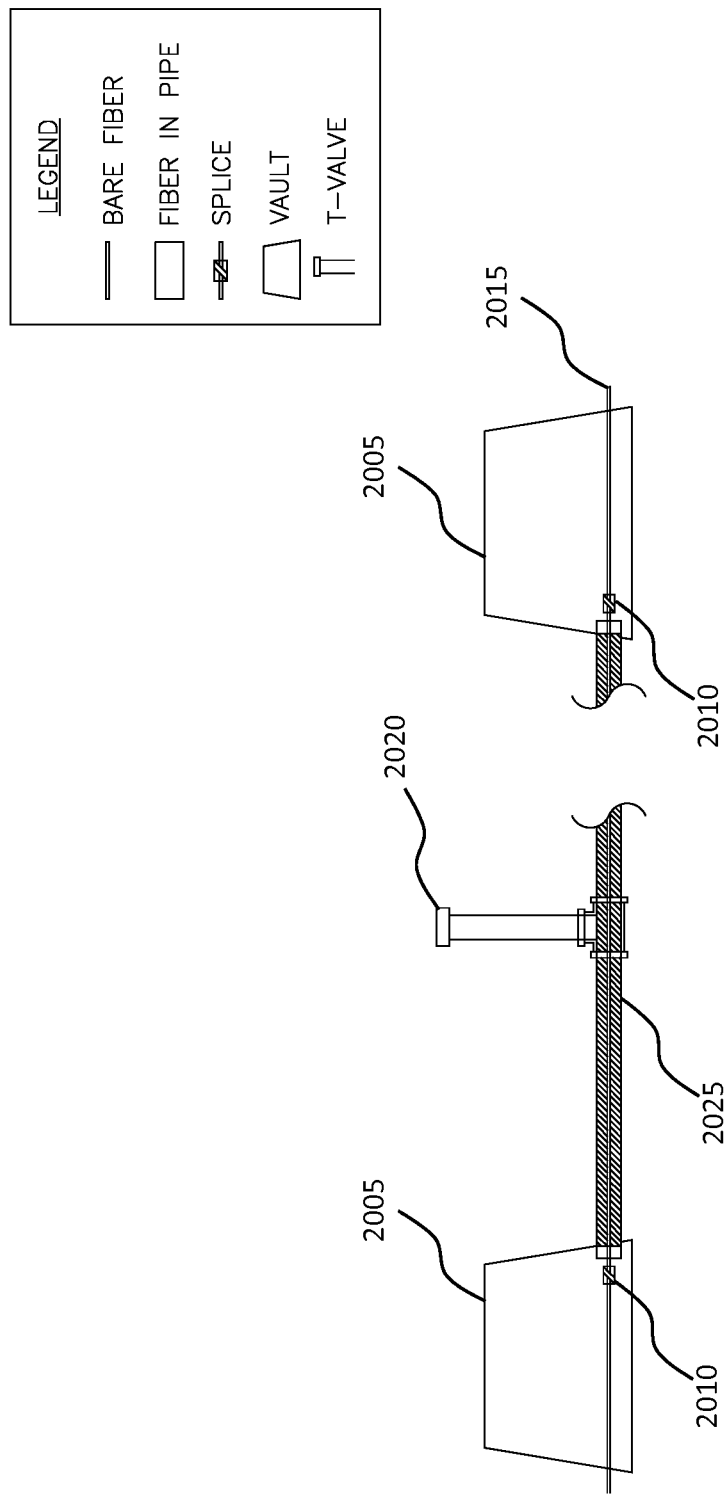
FIG. 15A depicts a side view of an example fiber configuration for improved acoustic sensitivity.

Referring to FIGS. 15A through 15E, the fiber optic cable may be positioned within a pipe and surrounded by a coupling material wherein the coupling material has increased acoustic sensitivity. Fiber within a pipe could also be used as a test apparatus to experiment with different coupling materials in order to achieve the best results for increased sensitivity for different environments. An example of the pipe configuration is depicted in FIG. 15A where the section of FIG. 15A is designed such that the coupling material may be evacuated and replaced to allow for testing of multiple different coupling materials. In an example of FIG. 15A there is at least one tee connector with a vertical section of pipe extending to the ground surface in order to release air pressure during fill and to provide visual indicator of fill level during filling, or level during evacuation, herein referred to collectively as a t-valve 2020. A valve will be attached to each vertical pipe section and can be shut once filling is complete to prevent contamination of the coupling material. The tee connector 2020 may be placed near the center of the pipe section or it may be placed at the highest altitude of the pipe section. A pump may be placed at the tee 2020 in order to pump the coupling material into the pipe 2025 as well as to evacuate coupling material when replacing it. In the depicted example vaults 2005 are placed at each end of the pipe section to provide access to the fiber 2015. Optionally, the fiber 2015 may be spliced 2010 just before and just after the pipe section to simplify removal/replacement of the various components.

Figure 15B:
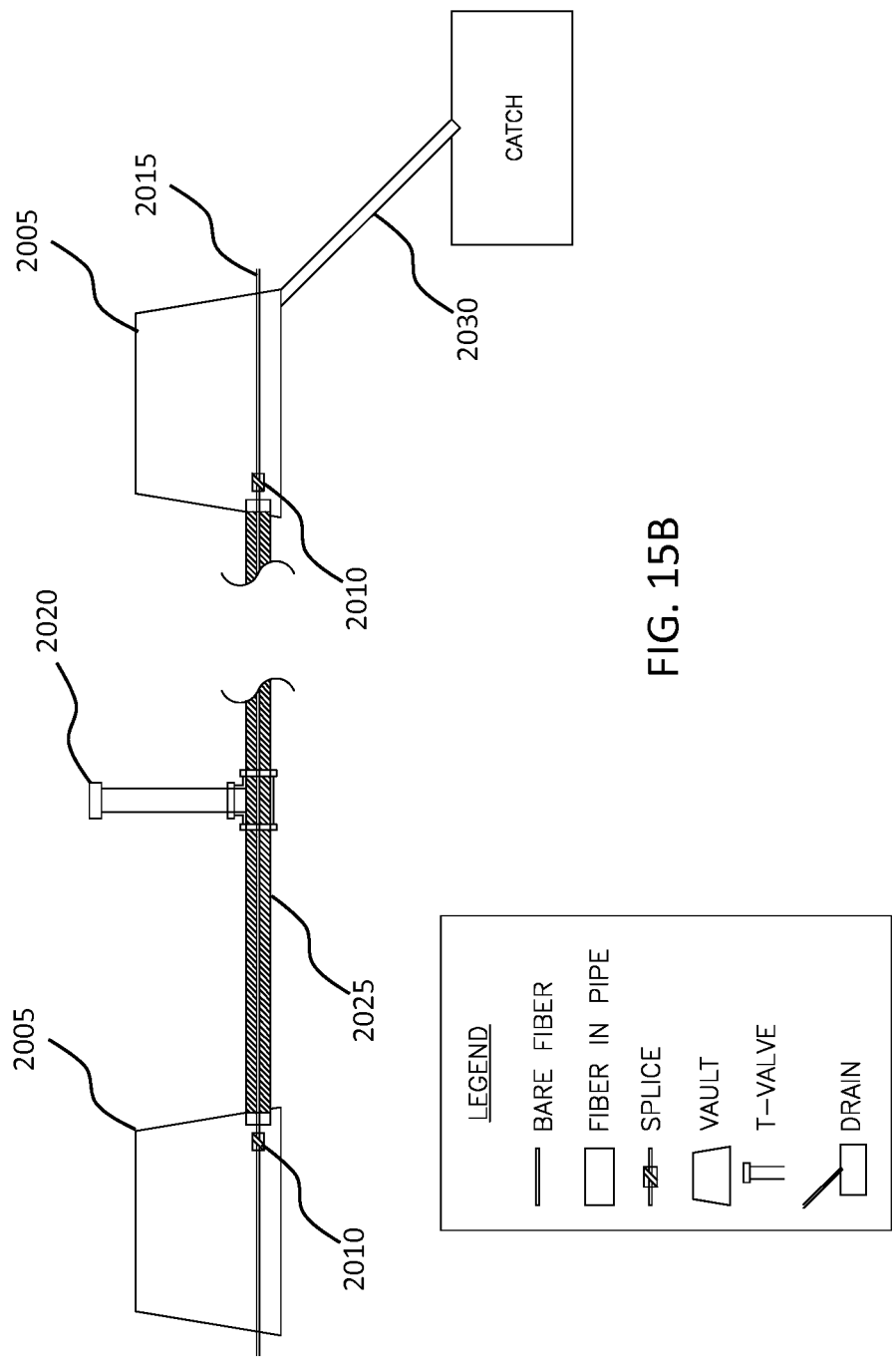
FIG. 15B depicts the example configuration of FIG. 15A with the addition of a catch basin.
Figure 15C:
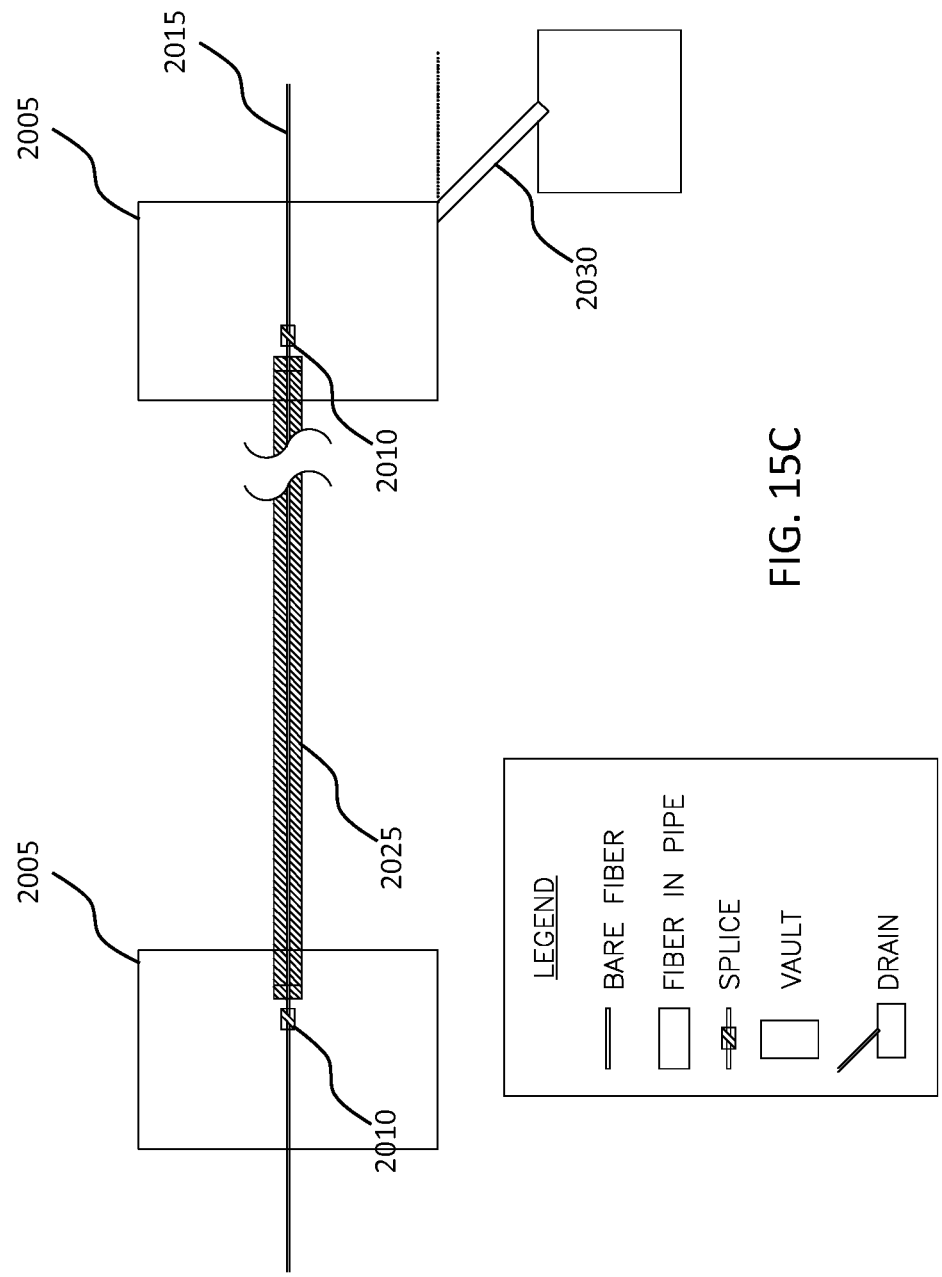
FIG. 15C depicts a top view of FIG. 15C.

FIGS. 15B and 15C depict an example of FIG. 15A further comprising a drain 2030 at one end which may be used to remove the discarded coupling material to a remote catch basin. The purpose of the drain 2030 is twofold: to keep the discarded coupling material from affecting the soil characteristics in the region surrounding the fiber 2025 and to keep potentially damaging runoff (from the couplants) from affecting the environment. The catch basin is designed such that it can handle the capacity of the coupling material and it can be easily removed for waste dumping.

Figure 15D:
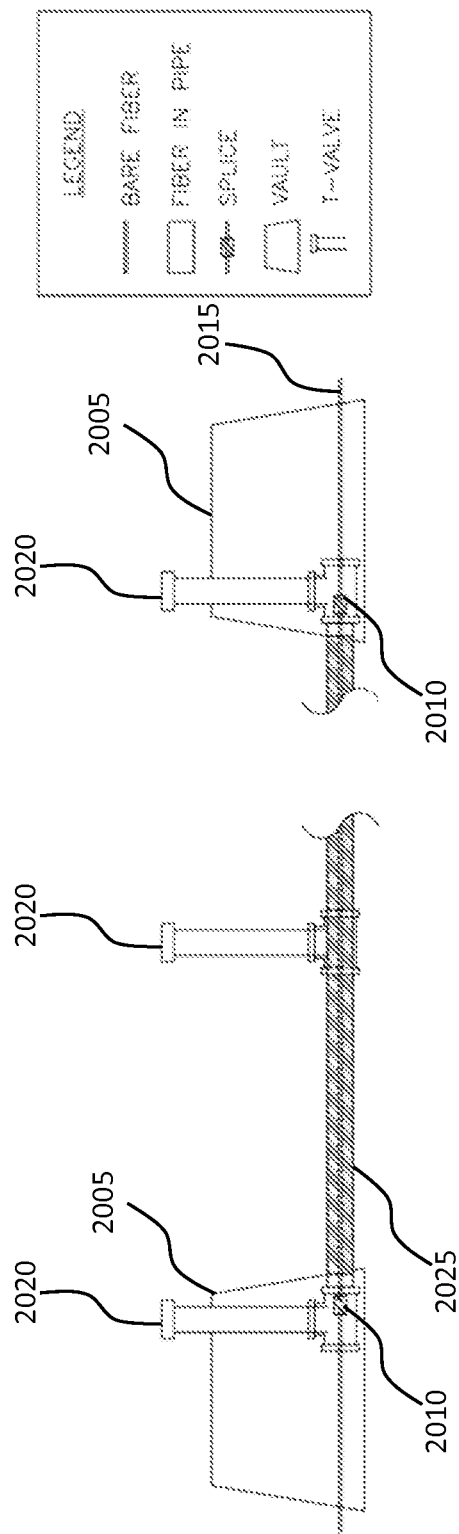
FIG. 15D depicts an example of FIG. 15A with the addition of a pressure relief mechanism.
Figure 15E:
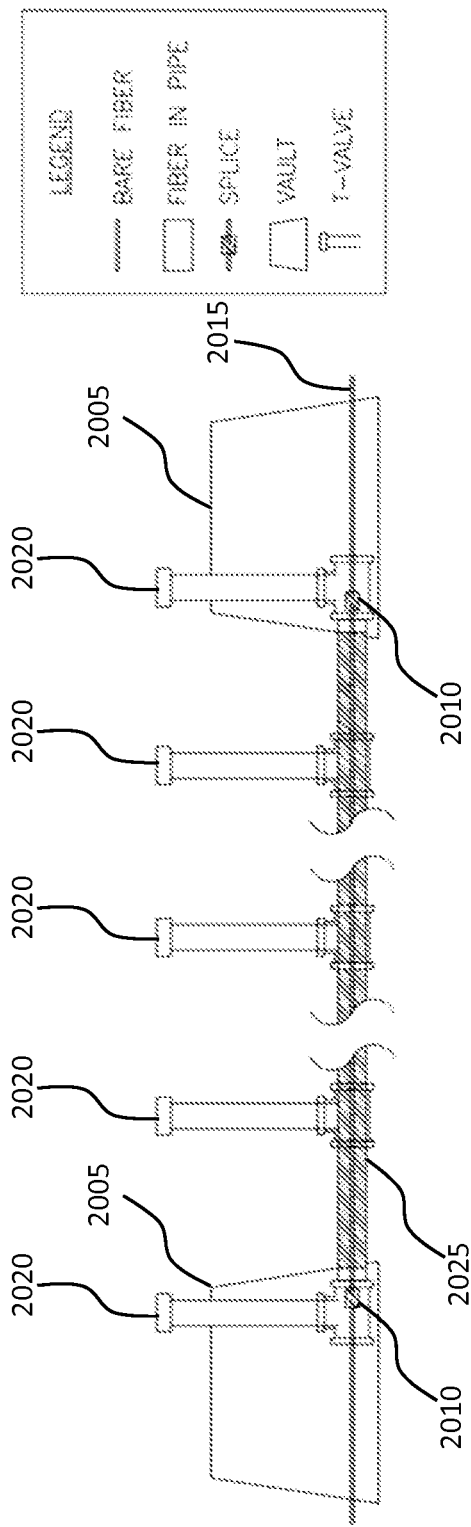
FIG. 15E depicts an example of FIG. 15A with the addition of more than one pressure relief mechanism.

FIGS. 15D and 15E depict an example of FIG. 15A further comprising additional t-valves 2020 for further pressure relief during filling and evacuation of the pipe 2025. FIG. 15D depicts an additional t-valve 2020 at each end of the pipe section. FIG. 15E depicts additional t-valves 2020 at intervals in the pipe section. Each t-valve 2020 should be placed such that the valve is accessible. Placement may include additional vaults 2005 (not depicted) around each t-valve 2020.

Figure 16:
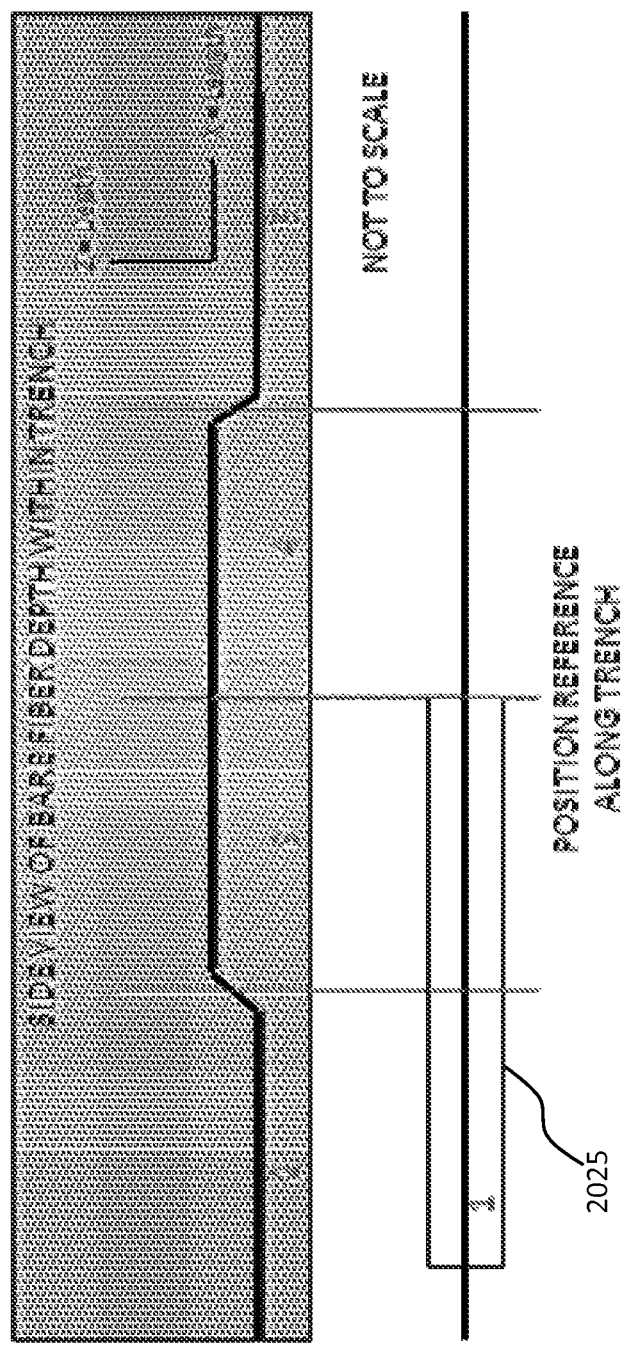
FIG. 16 depicts fiber sensitivity test segments buried with different depth relationships.
Figure 17:
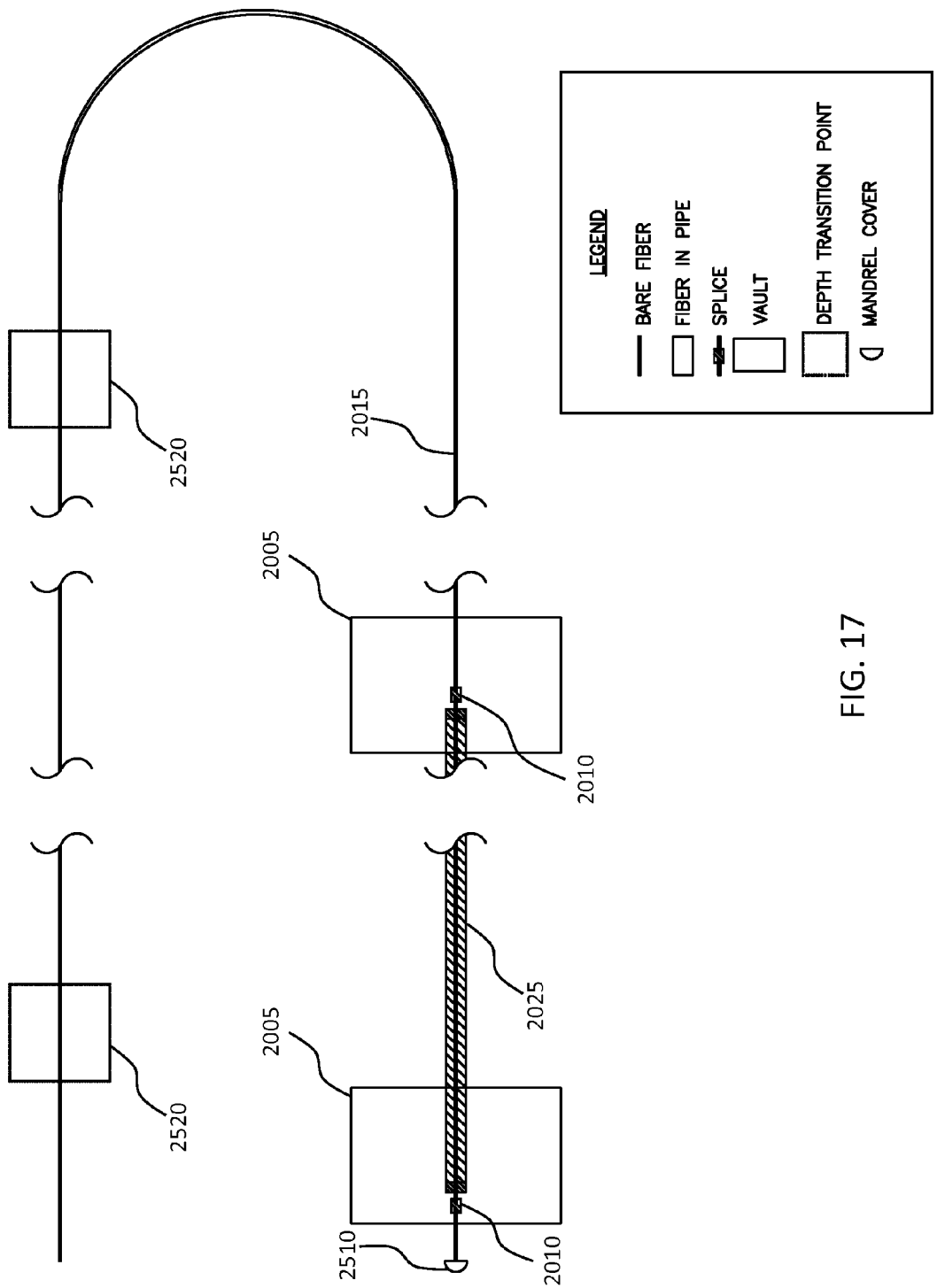
FIG. 17 depicts a parallel fiber configuration.

FIG. 16 depicts placement of fiber at different depth relationships. FIG. 17 depicts a top view of the system discussed in FIG. 16. The hatched portion in the drawing represents soil. The top hatched portion of the figure depicts the fiber placed deeper in fiber sections 2 and 5 and shallower in fiber sections 3 and 4. The bottom portion of the figure (not hatched) is a position reference for a prototype test setup where a pipe section, as in FIGS. 15A through 15E, is tested against the fiber buried at different depths. In the bottom portion of the figure the pipe section is followed by control fiber laid parallel to the shallower fiber and the deeper control fiber. In section 2 the pipe test and the control fiber are laid at the same depth. In section 3 the pipe test and the control fiber are at different depths, where the control fiber is buried closer to the surface than the pipe test. Section 4 is the fiber control section that corresponds to the Section 3 test section. Section 5 is the fiber control section that corresponds to the Section 2 section.

Placing coupled fibers parallel with different depth relationships may provide information regarding direction of sound movement, which may be used for multiple purposes such as predicting future movement. Additionally, further tests will yield how depth affects reporting sensitivity, eventually yielding data for the optimum fiber depth for differing mediums and fiber types.

Figure 18:
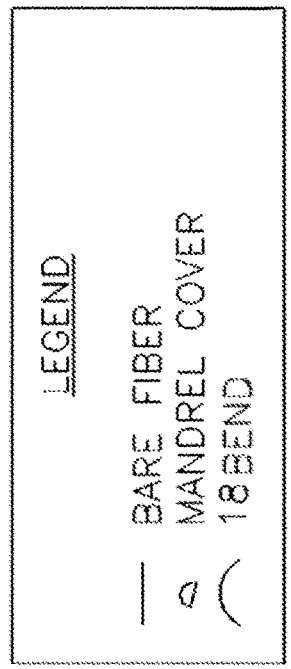
FIG. 18 depicts a triangle wave fiber configuration.
Figure 18:
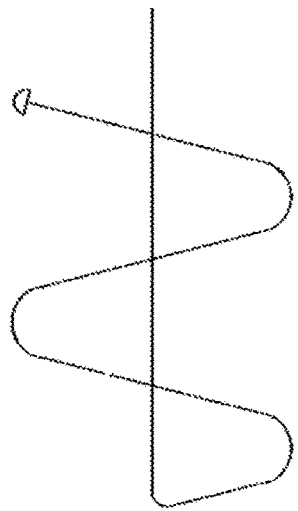

Referring to FIG. 18, laying fiber in a triangular wave pattern provides information about the direction a sound is emanating from as well as the direction and speed of travel if the sound is moving. FIG. 18 depicts an option wherein the wave crosses over a straight fiber. The bending radius of the fiber will be dependent on the characteristics of the fiber used as well as the size of the overall implementation. Fiber crossing fiber should provide further data regarding where the sound is emanating from as well as the direction and speed of travel. The information from the crossing fiber section can be combined and/or compared with the information retrieved from the wave section in order to yield a more accurate estimate. While triangle wave is specifically discussed, other wave patterns are possible. For instance a sine wave may be used. However, a triangle wave is simpler to implement and the code is simpler, thus being generally less expensive than other contemplated wave patterns. A triangle wave is proposed in place of a true sine wave because it is simpler and less expensive to lay the fiber and generate code for a sine wave. Further, placing a coupled reflector beneath a section of fiber will reflect a signal back up as an echo, which can be used to triangulate the source of the sound impinging upon the fiber and elevating detection threshold. There are many options for materials and shapes of reflectors. A smooth material such as metal will reflect the sound more effectively than a porous material. A parabola shape will be the most effective shape as any wave impinging on it will always reflect to the focal point of the parabolic reflector and thus elevate the detection threshold.

Higher soil hydration enhances the acoustic sensitivity of the buried fiber therefore seeding the soil coupled with the fiber optic sensor array with a moisture retaining substance will cause an elevated detection threshold. One notable coupling substance that increases acoustic sensitivity through a medium is Sodium Polyacrylate. Sodium Polyacrylate is easily obtainable, absorbs 200-300 times its mass in water, immobile in landfills (>90% retention), biodegradable over time, non-hazardous, and the hydration reaction is reversible.

An alternative coupling medium to the Sodium Polyacrylate is standard potting soil. Potting soil usually contains Perlite and other water absorbing chemicals that keep the soil moist for longer periods between watering. Potting soil is readily available and relatively inexpensive. Another option is to mix some Sodium Polyacrylate into potting soil for more absorptive yet still reasonably inexpensive soil seeding.

Another option is to place the seeded soil mixture into a porous tube that surrounds the optic fiber. The tube serves to hold the material onto the fiber as well as prevent other materials and rocks getting too close to the fiber while elevating the soil hydration in the area coupled to the pipe.

Generally, to prove these aspects of the disclosure, a system implemented to test the underlying theories behind various improved measurement concepts, the following controlled tests were conducted per Tables 1 and 2 below:

TABLE 1

| Test # | Surrounding Material | Reflector |
|---|---|---|
| A | Standard Soil | No |
| B | Standard Soil | Yes |
| C | Seeded Soil | No |
| D | Seeded Soil | Yes |
| E | Water | No |

TABLE 2

| Test # | Pipe Type | Pipe Filler | Surrounding Material |
|---|---|---|---|
| 1 | PVC | Water | Standard Soil |
| 2 | PVC | Glycerin | Standard Soil |

In each test the microphone was placed ten inches below the top of the filler material and centered within the test box. The speakers were suspended above the test box. For all tests, sound was generated by the same tone generator, at the same set of frequencies with a sine wave sampled at a rate of 44.1 kHz through the same speaker. Each tone from the tone generator was generated for five seconds five times for each test setup. Tones were generated at 50 Hz, 500 Hz, 2.5 kHz, 10 kHz, and 15 kHz. The tests resulted in the fresh water (Control E) and the seeded soil with reflector (Control D) coupling tests performing exceptionally well. The remaining tests were only small detection threshold improvements upon standard fiber with standard glacial loam soil. The PVC filled with coupling material tests performed about the same for glycerin and water as couplants, both of which were only small improvements upon the standard fiber tests.

Figure 19:
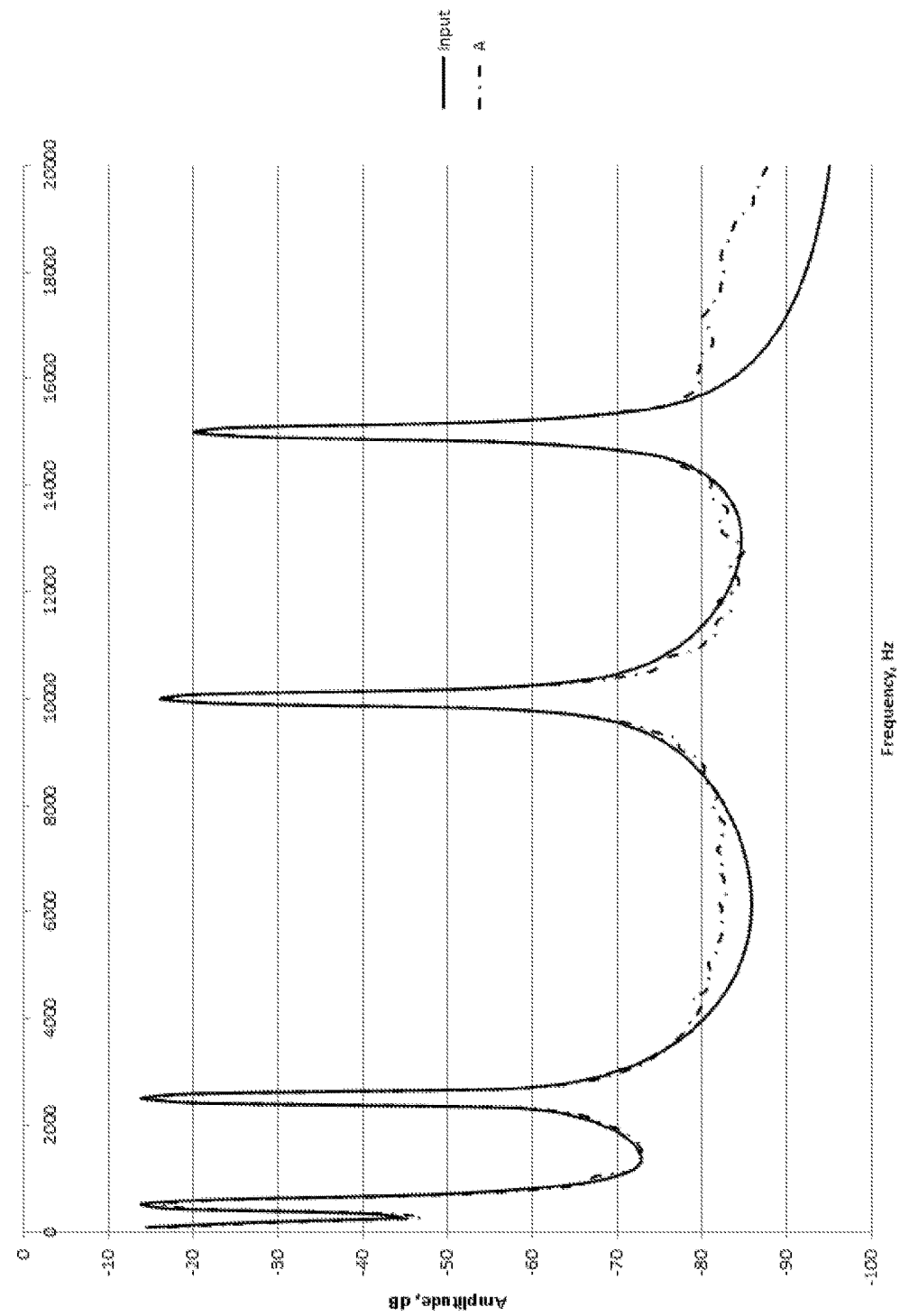
FIG. 19 is a frequency spectrogram for prototype Test A.
Figure 20:
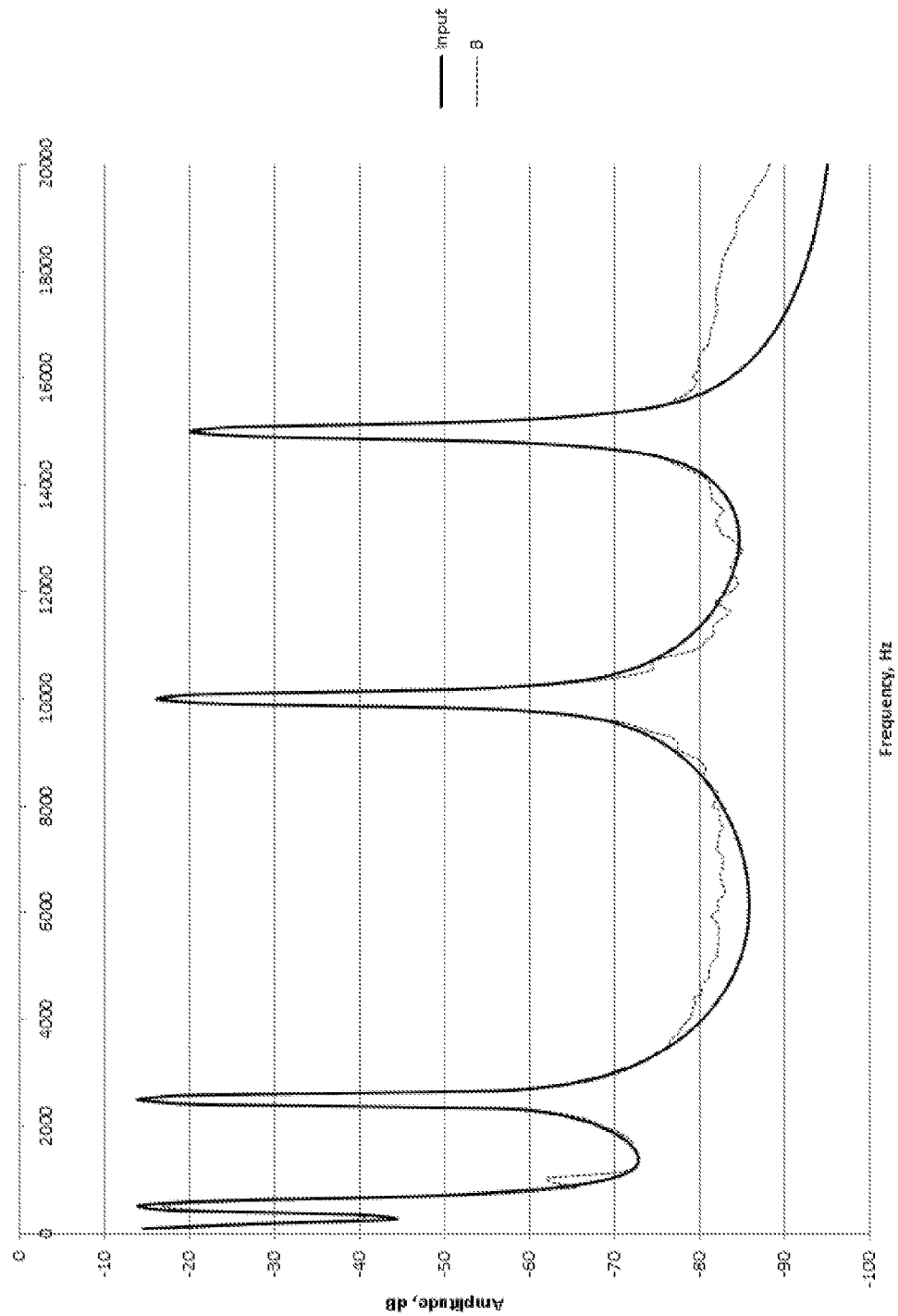
FIG. 20 is a frequency spectrogram for prototype Test B.
Figure 21:
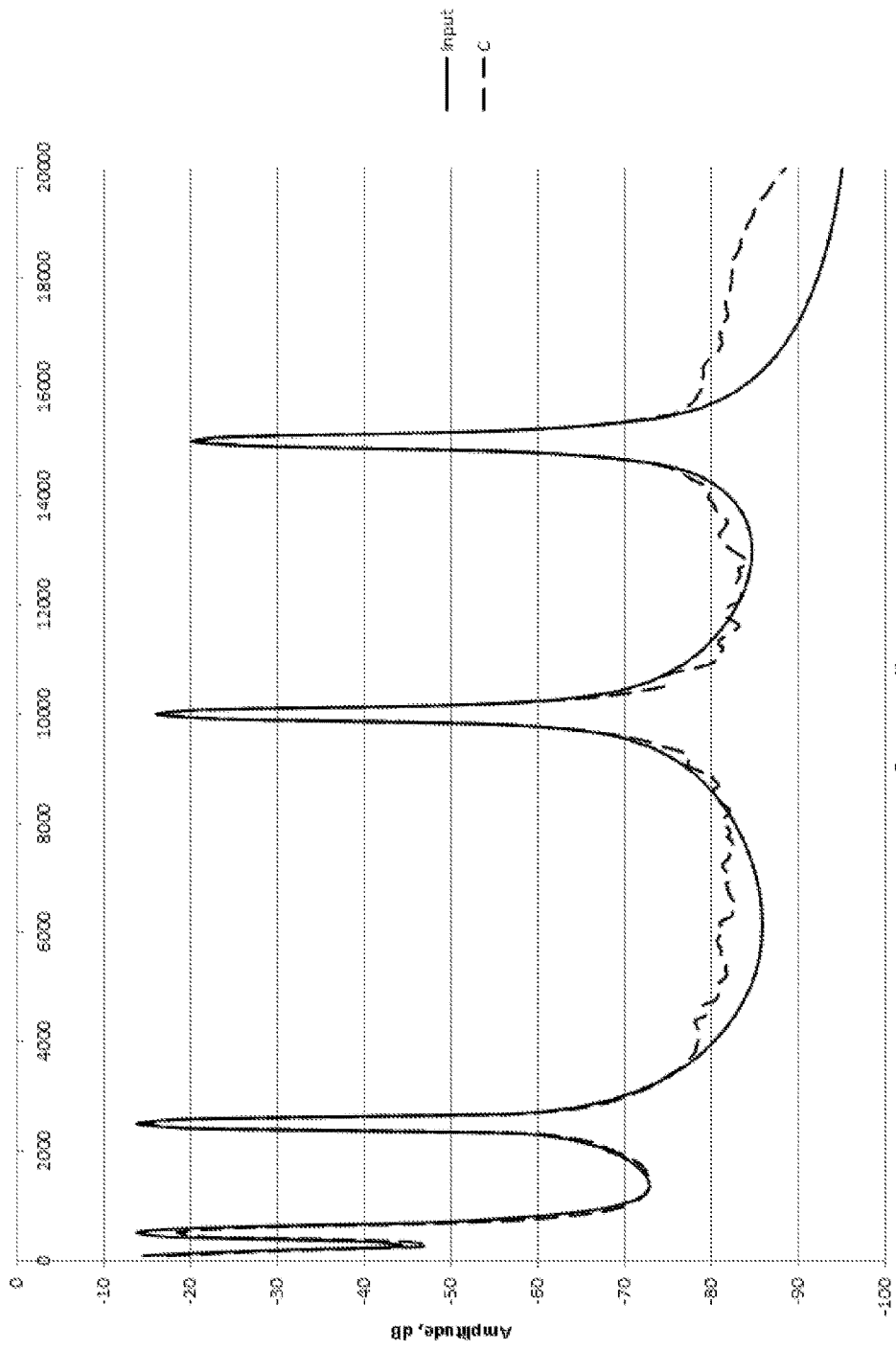
FIG. 21 is a frequency spectrogram for prototype Test C.
Figure 22:
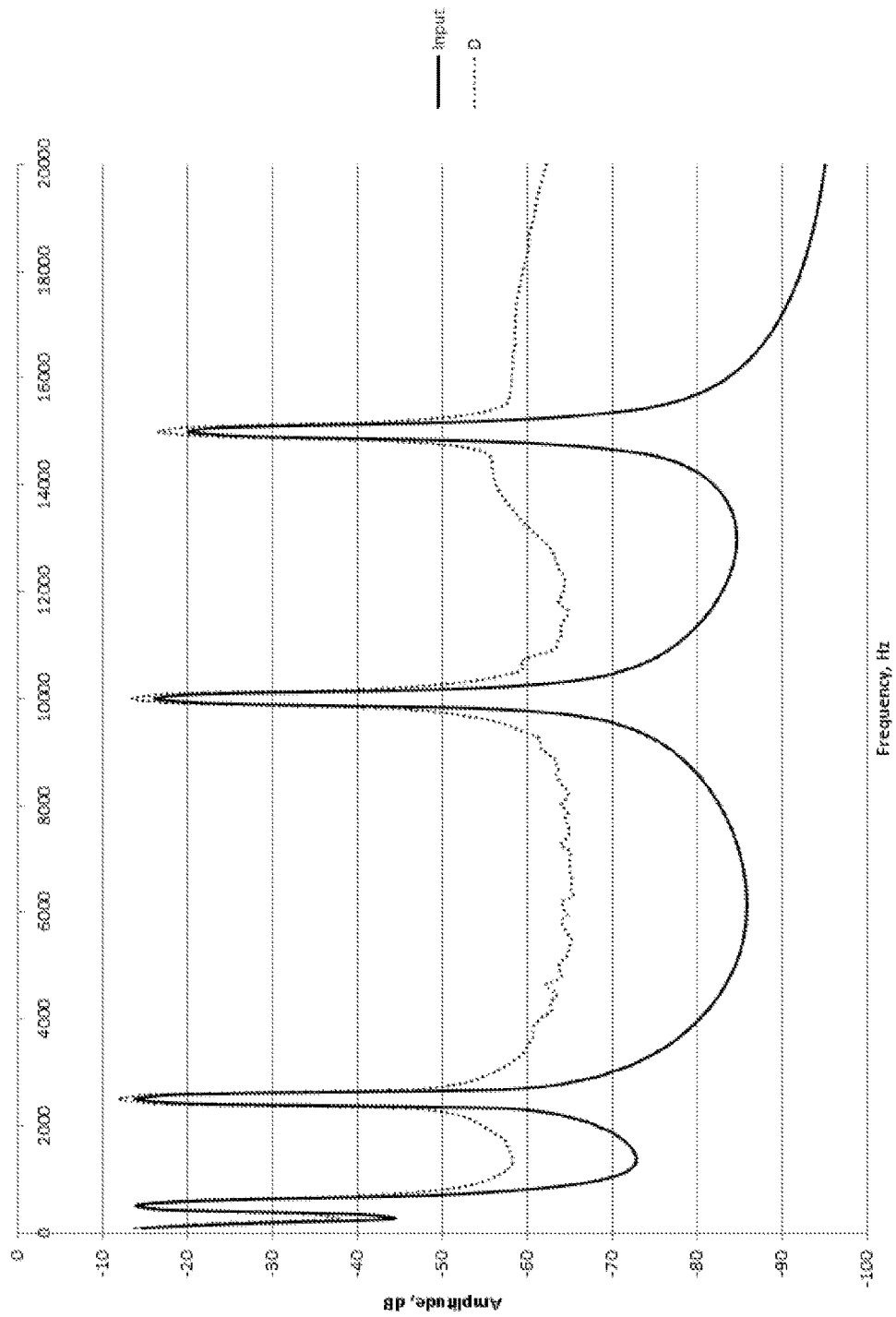
FIG. 22 is a frequency spectrogram for prototype Test D.
Figure 23:
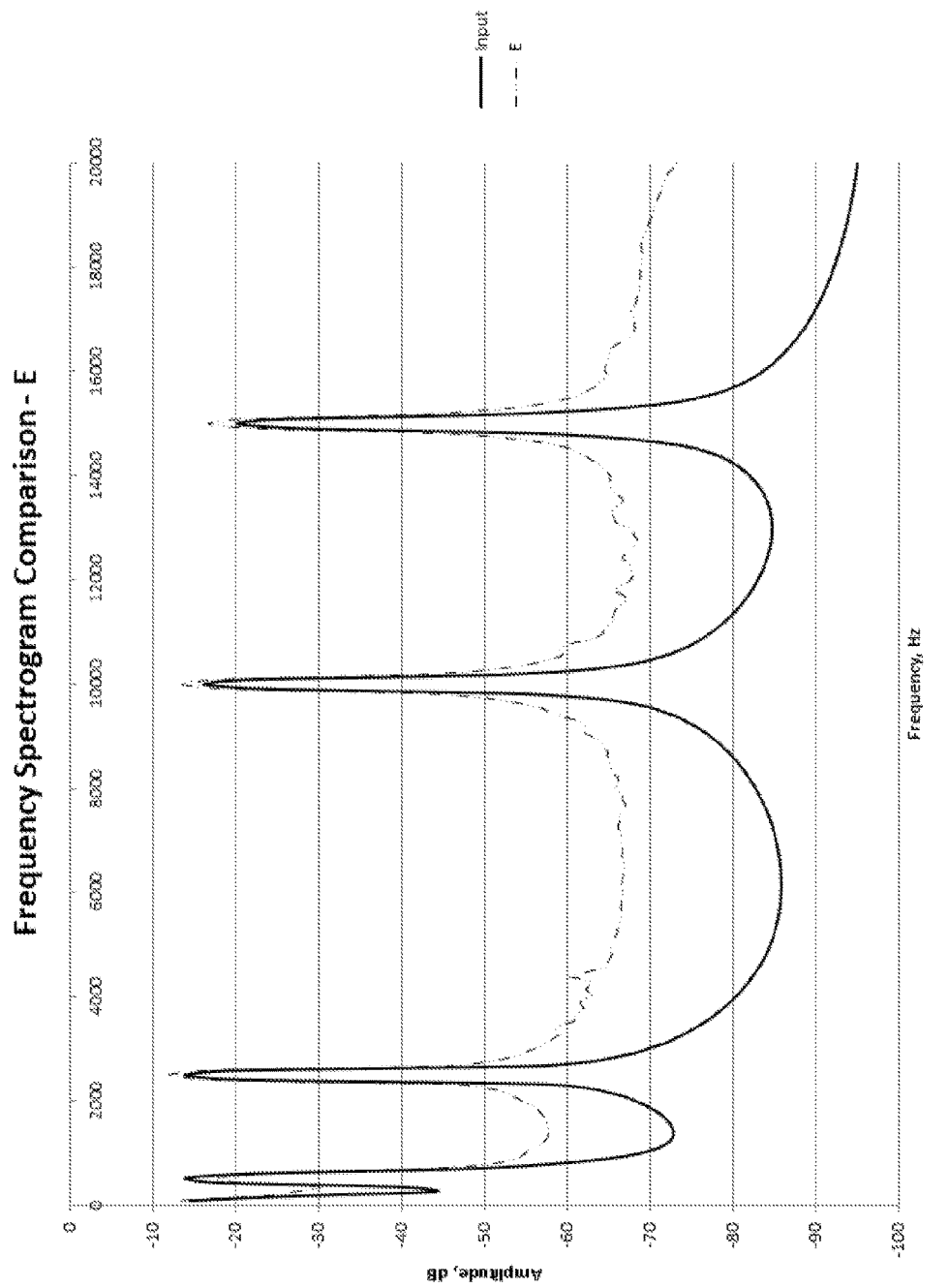
FIG. 23 is a frequency spectrogram for prototype Test E.
Figure 24:
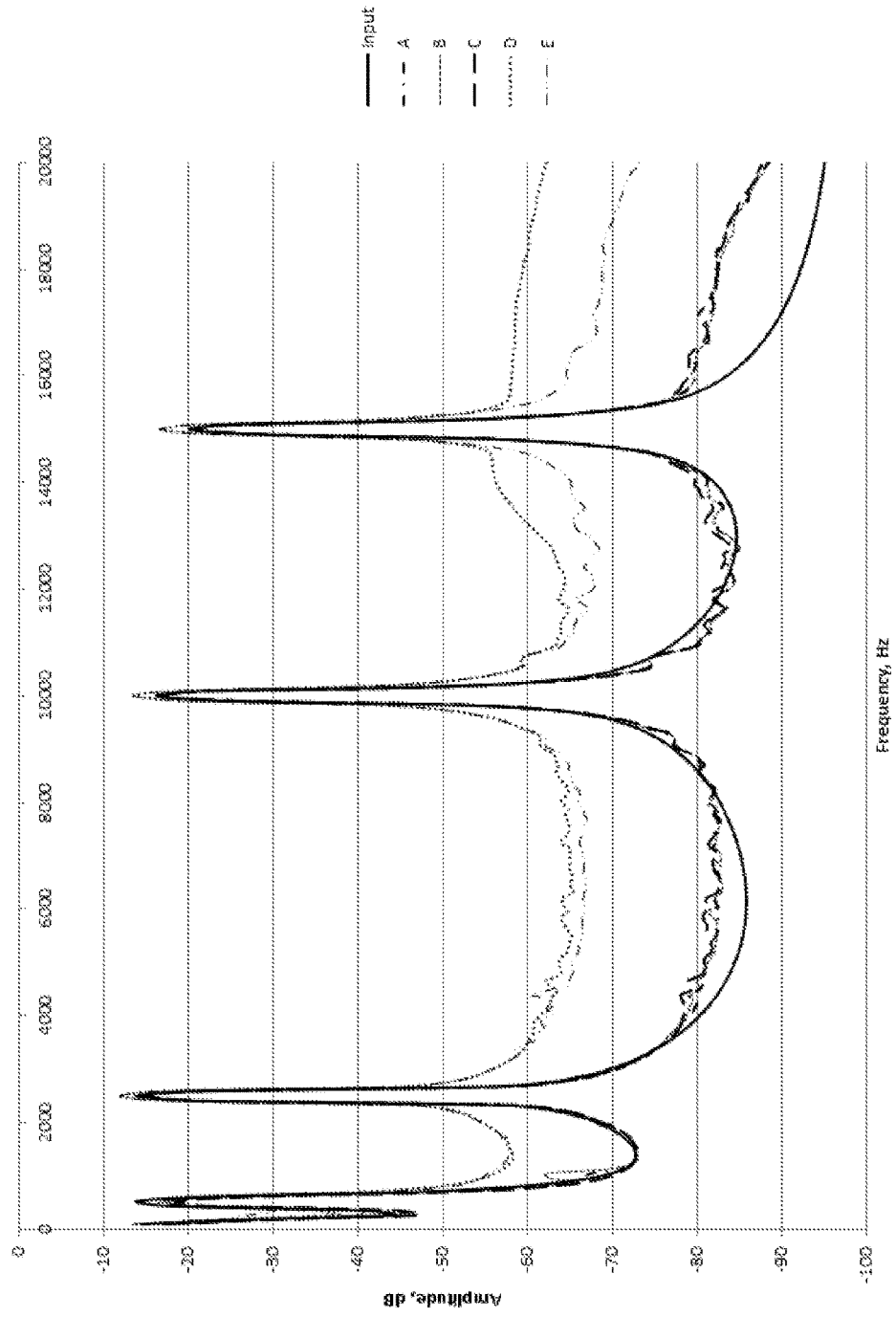
FIG. 24 is a frequency spectrogram for prototype Tests A-E.
Figure 25:
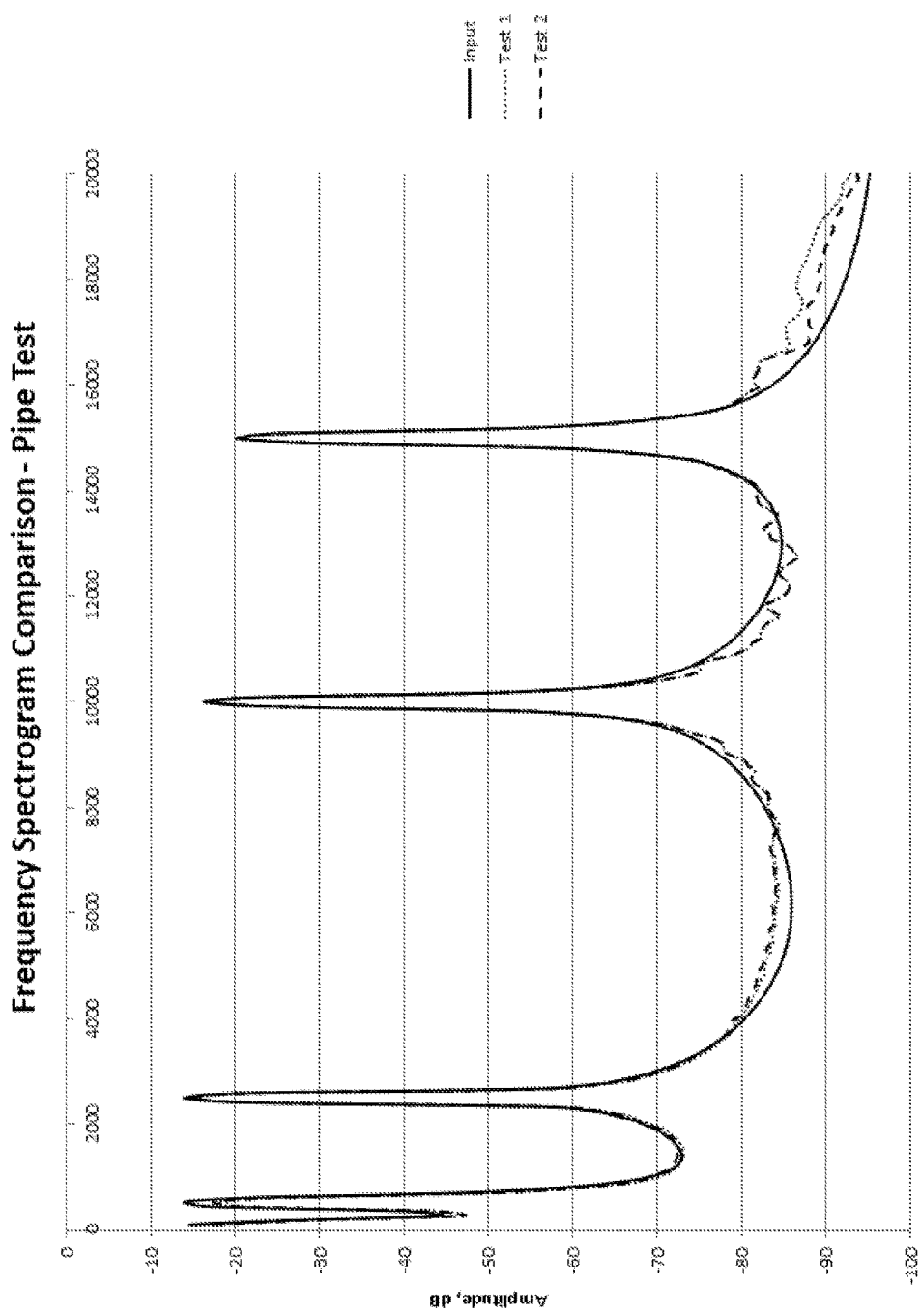
FIG. 25 is a frequency spectrogram for prototype Tests 1-2.

The results are depicted in frequency spectrograms in FIGS. 19 through 25. FIG. 19 is a frequency spectrogram for prototype Test A. FIG. 20 is a frequency spectrogram for prototype Test B. FIG. 21 is a frequency spectrogram for prototype Test C. FIG. 22 is a frequency spectrogram for prototype Test D. FIG. 23 is a frequency spectrogram for prototype Test E. FIG. 24 is a frequency spectrogram for prototype Tests A-E. FIG. 25 is a frequency spectrogram for prototype Tests 1-2.

With a focus now on an example that discloses reducing noise in a laser coupler, it is well known in the art that fiber couplers are commonly used basic components of many fiber-optic setups. Note that the term fiber coupler is used with two different meanings. It can be an optical fiber device with one or more input fibers and one or more output fibers. Light from an input fiber can appear at one or more outputs, with the power distribution potentially depending on the wavelength and polarization. It can also be a device for coupling light from free space into a fiber. The term "fiber coupler" or "coupler" used herein shall refer to couplers of the first definition and not the second. Fiber couplers are usually directional couplers, which means that essentially no optical power sent into an input port can go backwards into the same port or other input ports. There is often a specification of return loss, which indicates how much weaker the back-reflected light is, compared with the input.

If all fibers involved are single mode there are certain physical restrictions on the performance of the coupler. In particular, it is not possible to combine two or more inputs of the same optical frequency into a single polarization output without significant excess losses, except if the optical phases of the input beams are precisely adjusted and stabilized. That means that the two inputs to be combined would have to be mutually coherent. Multimode fiber combiners allow the powers of two mutually incoherent beams to be combined without a power loss. However, this will cause some loss of brightness.

In a further discussion of noise reduction, it is understood in the art the ratio of optical power at two different wavelengths can be continuously measured for any change and used as an indicator of fiber tapping or naturally occurring event requiring further investigation. The wavelength dependent loss of a single-mode fiber such as a Corning SMF28 fiber wrapping around a metal mandrel is used as an example. Mandrel radius and wrap angle (where one turn is 360 degrees) define the amount of loss. A change in radius will produce a similar monotonically increasing loss with wavelength curve but with slightly different curvature. A multimode fiber or other types of suitable fiber would have other wavelength dependent loss values.

Figure 26:
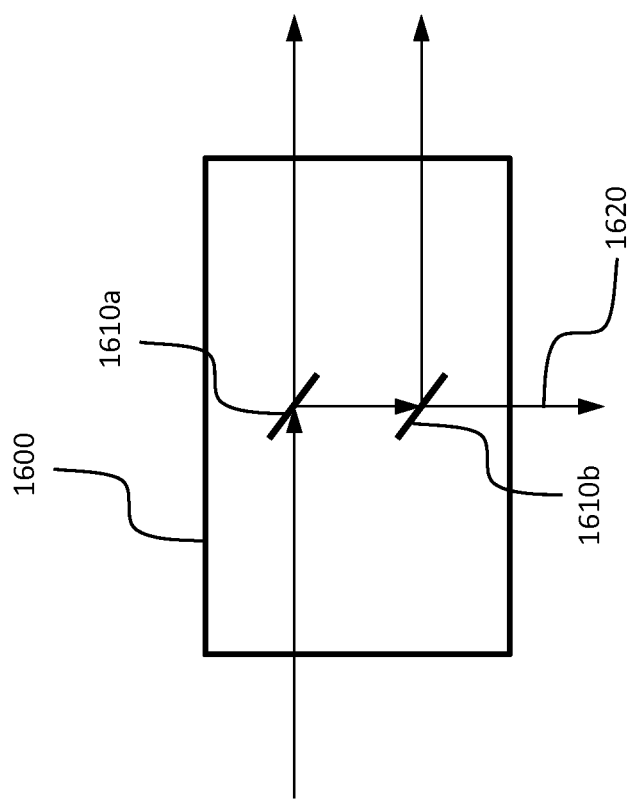
FIG. 26 depicts a standard two-way beam splitter.
Figure 27:
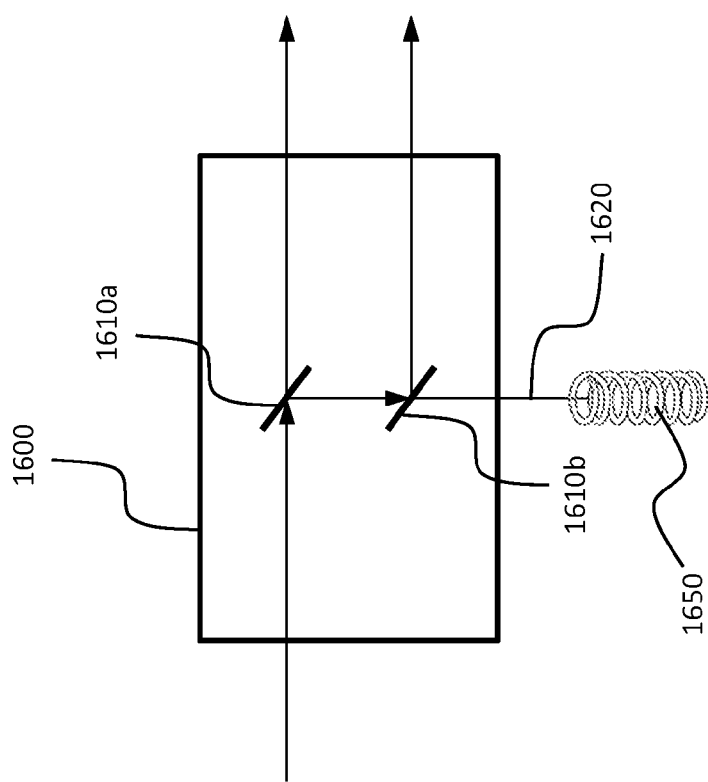
FIG. 27 depicts the beam splitter of FIG. 26 with a mandrel to reduce noise.

When working with very small back reflected signals, it is critically important the system mitigate as much noise sources as possible to be able to detect and demodulate back reflected signals; referring now to FIGS. 26-27. In practice, beam splitters 1600 cause a fairly significant amount of signal loss. Two-way splitters often have built in mirrors (1610a and 1610b) which send a portion of the signal out in a third undesired direction 1620, causing additional backscatter in the signal. To reduce noise, a three-way beam splitter may be used in place of the two-way beam splitter. Another method includes using a mandrel to attenuate unwanted signals by running fiber from the additional output beam and wrapping it in a tight mandrel 1650 (bent beyond the bend radius) the signal may be attenuated until it is completely absorbed. Since all of the energy being sent into the third port is absorbed, none is reflected thus removing noise at the beam splitter 1600.

In an example for an open-ended fiber optic detection system, a false positive peak in the backscatter will always be present at the remote end of the fiber due to laser power reflecting back. The higher the value of the laser power reflected back, the more information is lost in the noise. Should a true detection event occur at the remote end of the span, it would be difficult or impossible to differentiate from noise in the backscatter. For instance, the returning light may return with an incorrect code (time delay) impinged onto it, thus providing a false positive at one point in the fiber, and potentially hiding the location of a true event. It is imperative to provide a system wherein this end-of-span backscatter may be attenuated such that true events may be determined at the remote end of the span, less information is lost, and returning light is not impinged with false time delay data. To do this, another noise canceling method is disclosed for a non-reflective remote end; a tightly wound mandrel may be used to attenuate laser power so that it does not reflect from the remote end of the span. Added advantages of using a mandrel include: uniform, predictable remote end of span response; and minimized instances of false or useless data.

Figure 28A:
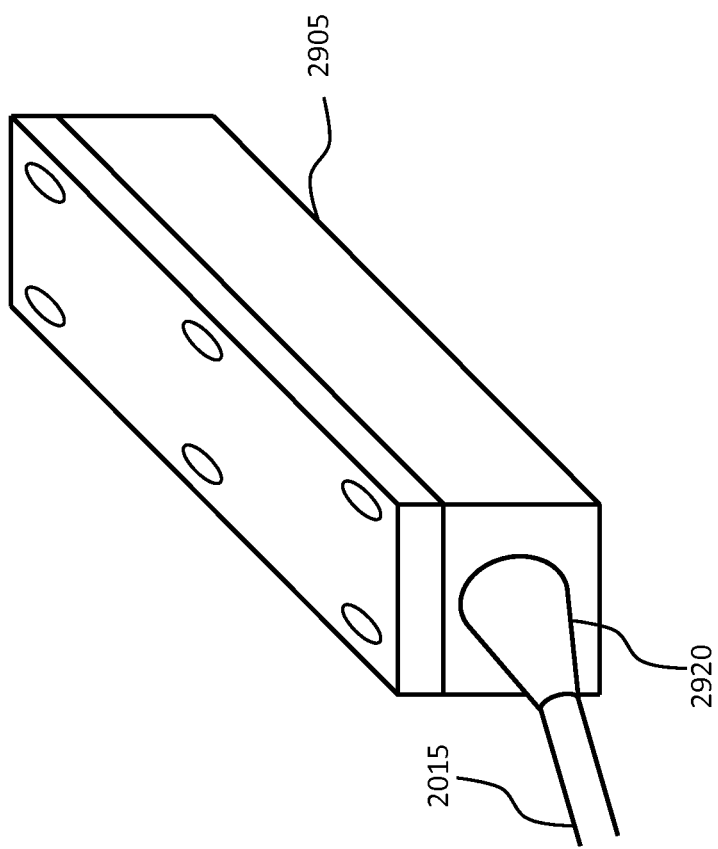
FIG. 28A depicts an example for an encased mandrel assembly.

FIGS. 28A through 28D depict an example for an encased mandrel assembly. FIG. 28A depicts the casing 2905 which is used to protect the mandrel assembly from the environment as well as to provide additional sound and vibration dampening. The fiber 2015 enters the mandrel assembly at one end. The fiber 2015 is wound around a cylinder within the casing 2905 to form the mandrel. The location where the fiber 2015 enters the casing 2905 is protected with and interfacing mechanism 2920 which may take the form of a strain relief coil spring (as depicted).

Figure 28B:
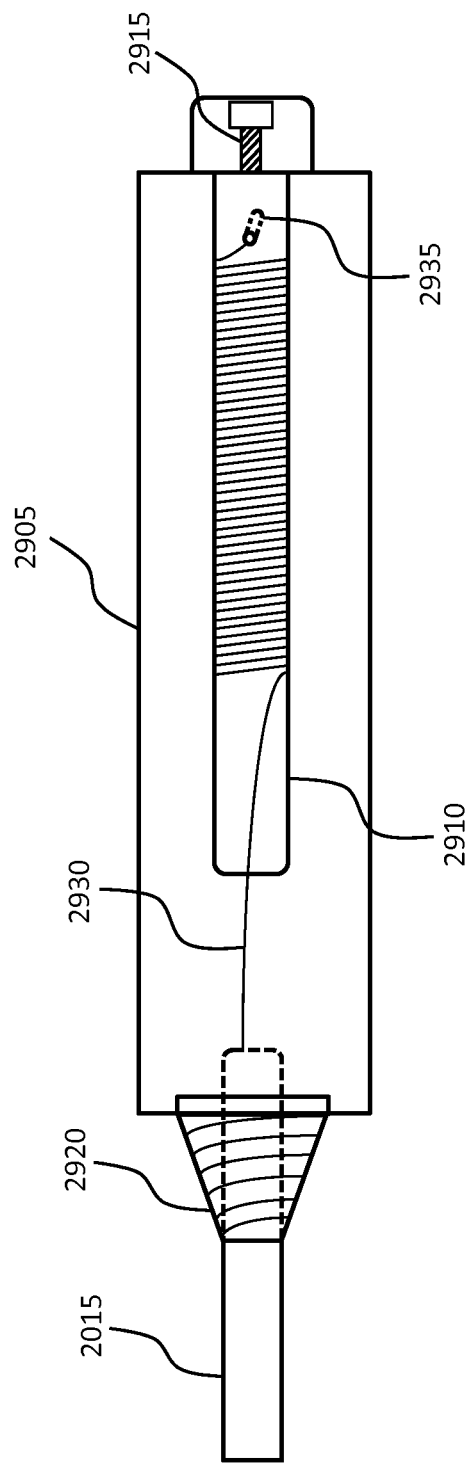
FIG. 28B depicts the internal components of the mandrel assembly of FIG. 28A.

FIG. 28B depicts the internal components of the mandrel assembly of FIG. 28A. The fiber 2015 enters a first end of the casing 2905. Just inside the casing 2905, the fiber is stripped of the cladding (bare fiber 2930). The bare fiber 2930 is wrapped around a cylinder 2910 evenly and with no overlaps. The crushed end of the bare fiber 2930 is inserted into a hole 2935 in the cylinder 2910. The characteristics of the particular fiber used will dictate the length of fiber to be wound on the mandrel, the diameter of the cylinder, and/or the number of wraps. After the fiber has been wrapped and secured, one or more screws 2915 are tightened at the second end of the casing 2905 to fully lock the internal components into place.

Figure 28C:
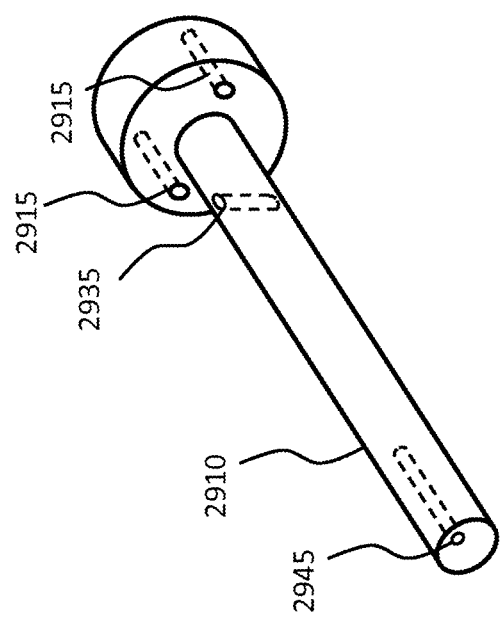
FIG. 28C depicts a view of the cylinder around which the fiber is wrapped to form the mandrel of FIG. 28A.
Figure 28D:
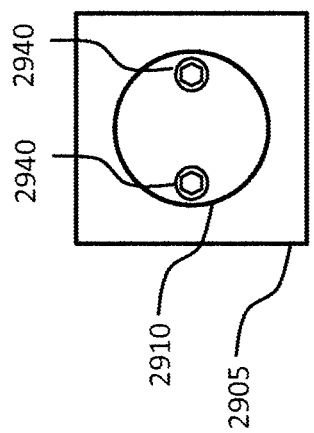
FIG. 28D depicts an example for a securing mechanism for locking the cylinder within the mandrel assembly of FIG. 28A after the fiber has been wound.

FIG. 28C depicts a view of the cylinder 2910 around which the bare fiber 2930 is wrapped to form the mandrel of FIG. 28A. FIG. 28D depicts an example for a securing mechanism for locking the cylinder within the mandrel assembly of FIG. 28A after the fiber has been wound. The cylinder 2910 is secured with one more screws 2915. Other securing mechanisms are contemplated. The fiber is terminated in 2945.

Figure 29:
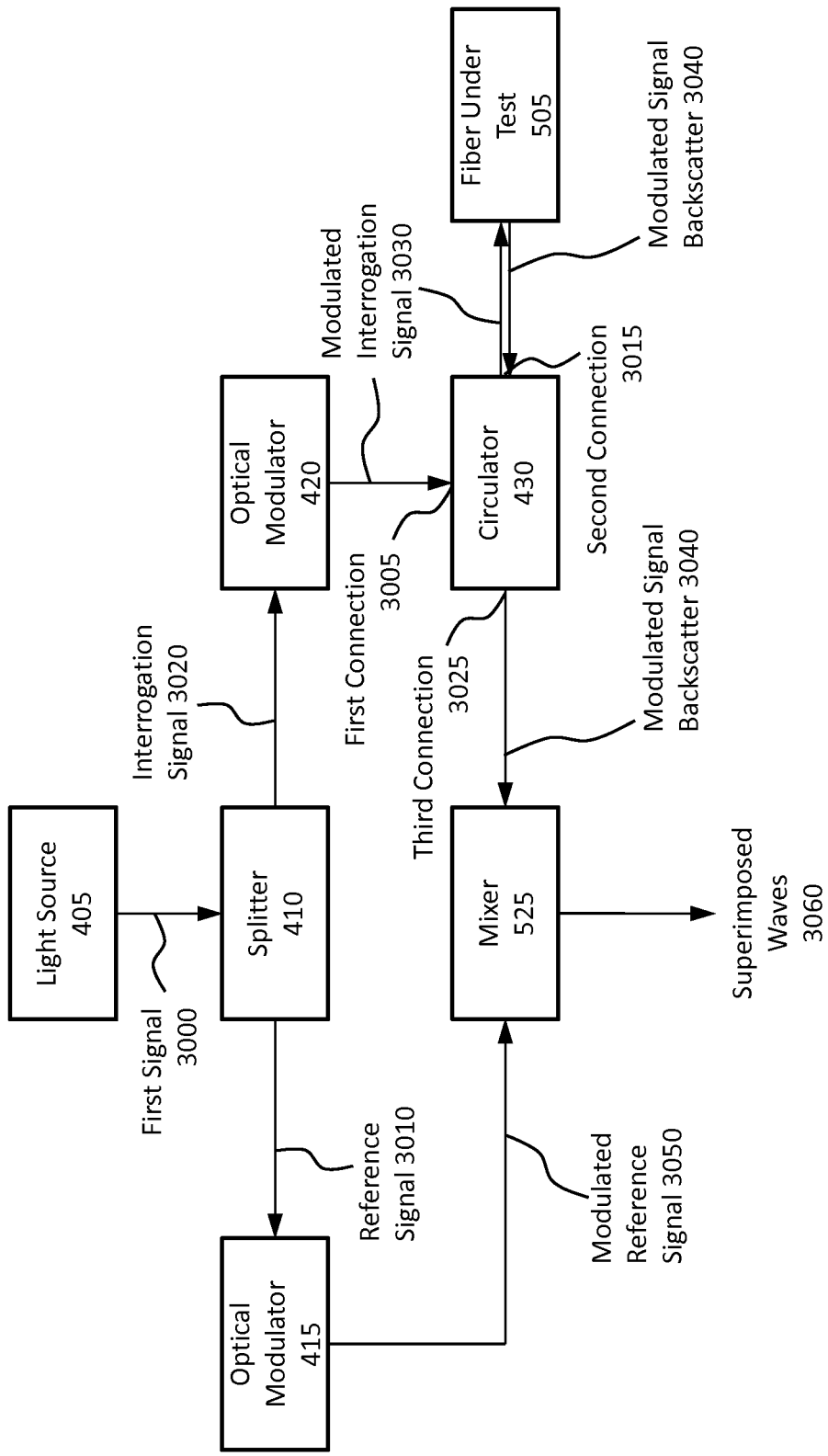
FIG. 29 is an overall system diagram depicting a method for generating superimposed waves.

FIG. 29 is an overall system diagram depicting a method for generating superimposed waves. A light source 405 generates a first signal 3000. The first signal 3000 travels into a splitter 410 where it is split into a reference signal 3010 and an interrogation signal 3020. The reference signal 3010 is modulated by a first optical modulator 415. The interrogation signal 3020 is modulated by a second optical modulator 420. The modulated interrogation signal 3030 enters a first connection 3005 of a circulator 430. The modulated interrogation signal 3030 is transmitted from a second connection 3015 on the circulator 430 into a fiber under test 505. The circulator 430 receives at the second connection 3015 a modulated signal backscattered 3040 from the fiber under test 505. The circulator 430 transmits the modulated signal backscattered 3040 from the fiber under test 505 from a third connection 3025 into a mixer 525. The mixer 525 receives the modulated reference signal 3050 from the first optical modulator 415. The mixer 525 mixes the modulated reference signal 3050 and the modulated signal backscattered 3040 from the fiber under test 505 into superimposed waves 3060.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention thereof, it should be apparent that the invention may be modified in arrangement and detail without departing from such principles. Claim is made to all modifications and variation coming within the spirit and scope of the following claims.

What is claimed is:

1. An integrated fiber optic interferometry interrogator system configured to generate superimposed waves, the system comprising:
   an optical light source configured to generate a first signal;
   a first signal splitter coupled to an output of the optical light source and configured to split the first signal into a reference signal and an interrogation signal;
   a first optical modulator configured to modulate the reference signal;
   a second optical modulator configured to modulate the interrogation signal;
   an optical coupler connected to an optical fiber;
   a circulator coupled to the second optical modulator, the circulator comprising a plurality of connections, wherein
   a first connection of the plurality of connections is configured to receive the modulated interrogation signal, a second connection of the plurality of connections is configured to transmit the modulated interrogation signal through the optical coupler and is configured to receive from the optical coupler a version of the modulated interrogation signal backscattered from the fiber, and a third connection of the plurality of connections configured to transmit through an isolator the backscattered version of the modulated interrogation signal; and a signal mixer comprising a plurality of signal couplers configured to receive the backscattered version of the modulated interrogation signal from the isolator, to receive the reference signal modulated by the first optical modulator, to mix the two received signals into the superimposed waves, and to transmit the superimposed waves into a plurality of photo diodes, wherein one or more of the photo diodes are each configured to output a respective RF signal including the superimposed waves.

2. The system of claim 1, wherein the light source includes a laser.

3. The system of claim 2, wherein the laser includes one of a continuous-wave (CW) laser and a pulse-modulated CW laser.

4. The system of claim 1, wherein the first optical modulator includes at least one of an acousto-optical modulator and an electro-optical modulator and wherein the second optical modulator includes at least one of an acousto-optical modulator and an electro-optical modulator.

5. The system of claim 1, wherein the fiber includes at least one of a single-mode-type, multimode-type, and polarization-preserving-type fiber-optic cable.

6. The system of claim 1, wherein each of the signal couplers includes at least one of a signal splitter and a signal combiner.

7. The system of claim 1, wherein the fiber has a length L and the light source includes a laser configured to generate a signal with sufficient stability so that the modulated interrogation signal is able to retain coherency in propagation along the fiber for a distance at least equal to two times the length L.

8. The system of claim 1, wherein the fiber has a coating thereon made of a thermoplastic material having the combined characteristics of a low Young's modulus and a Poisson's ratio below that of natural rubber, wherein the coating is configured to enhance the longitudinal component of strain variation derived from an acoustic wave signal.

9. The system of claim 1, wherein the plurality of photo diodes are connected to a plurality of amplifiers and wherein the amplifiers are configured to generate radio frequency signals.

10. The system of claim 1, further comprising a power supply.

11. The system of claim 1, wherein the system elements are at least one of optimally coupled, connected, and linked for at least one of maximum efficiency and lowest loss, wherein maximum efficiency includes at least one of cable length and number of splices.

12. The system of claim 1, wherein all signal splitters and signal couplers include a respective signal attenuator on each unused port.

13. The system of claim 12, wherein each signal attenuator is implemented by a respective mandrel.

14. The system of claim 1, wherein the system is enclosed by a material configured to attenuate vibration.

15. The system of claim 1, wherein the modulated backscattered signals are generated from at least one of acoustic pressure waves, electromagnetic fields, mechanical strain or pressure, and thermal strain or pressure.

16. A method comprising:
generating a first signal;
splitting the first signal into a reference signal and an interrogation signal;
modulating the reference signal using a first optical modulator;
modulating the interrogation signal using a second optical modulator;
using a circulator, coupled to the second optical modulator and comprising a plurality of connections
to receive, at a first one of the connections, the modulated interrogation signal,
to transmit, from a second one of the connections, the modulated interrogation signal into a fiber,
to receive, at the second one of the connections, a backscattered version of the modulated interrogation signal from the fiber, and
to transmit, from a third one of the connections, the backscattered version of the modulated interrogation signal; and
using a signal mixer comprising a plurality of signal couplers
to receive the backscattered version of the modulated interrogation signal from the third one of the connections of the circulator,
to receive the modulated reference signal from the first optical modulator, and
to mix the two received signals into superimposed waves.

17. The method of claim 16, wherein:
the fiber has a length L; and
generating the first signal includes generating the first signal with a stability sufficient for the modulated interrogation signal to retain coherency in propagation along the fiber for a distance at least equal to two times the length L.

18. The method of claim 16, wherein the fiber has a coating thereon made of a thermoplastic material having the combined characteristics of a low Young's modulus and a Poisson's ratio below that of natural rubber, wherein the coating enhances the longitudinal component of strain variation derived from an acoustic wave signal.

19. The method of claim 16, wherein the system is enclosed by a material conducive for vibration attenuation.

20. The method of claim 16, further comprising generating the modulated backscattered signals in response to at least one of acoustic pressure waves, electromagnetic fields, mechanical strain or pressure, and thermal strain or pressure experienced by the fiber.

21. A system, comprising:
a light source configured to generate a signal;
a splitter coupled to the light source and configured to split the signal into a reference signal and an interrogation signal;
a first modulator configured to modulate the reference signal;
a second modulator configured to modulate the interrogation signal;
a circulator coupled to the second modulator and configured to couple the modulated interrogation signal to an optical fiber, and to receive a portion of the modulated interrogation signal backscattered by the optical fiber;

a signal mixer coupled to the first modulator and to the circulator and configured to generate superimposed waves by mixing the backscattered portion of the modulated interrogation signal with the modulated reference signal; and photo diodes coupled to the signal mixer and configured to generate at least one RF signal including the superimposed waves.

* * * * *

UNITED STATES PATENT AND TRADEMARK OFFICE
CERTIFICATE OF CORRECTION

PATENT NO.        : 10,203,264 B2
APPLICATION NO.   : 14/837592
DATED             : February 12, 2019
INVENTOR(S)       : Dan Alan Preston et al.

Page 1 of 1

It is certified that error appears in the above-identified patent and that said Letters Patent is hereby corrected as shown below:

On the Title Page

The Inventor Section should read as follows:
(72) Inventors: Dan Alan Preston, Bainbridge Island, WA (US); Stephen Timothy Doll, Big Arm, MT (US); James Alexander Philp, Missoula, MT (US)

Signed and Sealed this
Tenth Day of March, 2020

Andrei Iancu
*Director of the United States Patent and Trademark Office*